(12) United States Patent
Ferry et al.

(10) Patent No.: US 9,026,928 B2
(45) Date of Patent: May 5, 2015

(54) GRAPHICAL USER INTERFACE LAYOUT

(75) Inventors: Ken Ferry, Mountain View, CA (US); Kevin Cathey, Santa Clara, CA (US); Ali T. Ozer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 13/572,551

(22) Filed: Aug. 10, 2012

(65) Prior Publication Data
US 2013/0332869 A1 Dec. 12, 2013

Related U.S. Application Data

(60) Provisional application No. 61/656,511, filed on Jun. 6, 2012.

(51) Int. Cl.
*G06F 9/44* (2006.01)
*G06F 3/0481* (2013.01)

(52) U.S. Cl.
CPC ............ *G06F 9/4443* (2013.01); *G06F 3/0481* (2013.01)

(58) Field of Classification Search
CPC .... G06F 9/4443; G06F 3/0481; G06F 3/0482
USPC .......................................................... 715/765
See application file for complete search history.

(56) References Cited

U.S. PATENT DOCUMENTS

| | | | |
|---|---|---|---|
| 6,330,005 B1 * | 12/2001 | Tonelli et al. ................... | 715/735 |
| 7,437,676 B1 * | 10/2008 | Magdum et al. ............... | 715/738 |
| 7,930,649 B2 * | 4/2011 | Mysore et al. ................. | 715/804 |
| 7,954,060 B2 * | 5/2011 | Sharma .......................... | 715/765 |
| 2004/0085345 A1 * | 5/2004 | Galou et al. .................... | 345/734 |
| 2004/0243945 A1 * | 12/2004 | Benhase et al. ................ | 715/853 |

* cited by examiner

*Primary Examiner* — David Phantana Angkool
(74) *Attorney, Agent, or Firm* — Blakely, Sokoloff, Taylor & Zafman LLP

(57) ABSTRACT

Exemplary methods, apparatuses, and systems receive user input to move, resize, or add a first user interface object to a first location in a user interface window. The user interface window includes a second user interface object in a second location. In response to the user input, constraints are generated based upon the first location and the second location. The constraints define a size or a position of the first user interface object relative to the second user interface object. The first user interface object is displayed within the user interface according to the determined constraints.

26 Claims, 22 Drawing Sheets

GRAPHICAL USER INTERFACE LAYOUT

CROSS-REFERENCE TO RELATED APPLICATIONS

This application claims the benefit of U.S. Provisional Application No. 61/656,511, filed Jun. 6, 2012, which is hereby incorporated by reference.

FIELD

The various embodiments described herein relate to apparatuses, systems, and methods to graphically construct and configure a graphical user interface. In particular, the embodiments relate to the generation and manipulation of constraints that define a size or a position of user interface objects within the graphical user interface.

COPYRIGHT NOTICE/PERMISSION

A portion of the disclosure of this patent document contains material this is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright 2012, Apple Inc., All Rights Reserved.

BACKGROUND

Designing a graphical user interface ("GUI") using a graphical user interface layout systems can be complex. While some layout systems provide a visual tool for graphically constructing and configuring a GUI, the generation of a flexible design (e.g., that can cleanly handle window resize, orientation changes, zoom operations, etc.) may include writing large amounts of code. The code that provides said flexibility may define a variable size or position of an object within the GUI depending upon, amongst other things, a size/resize of the GUI window.

Tools, such as various "springs and struts" models, may define the location of an object with respect to an edge of the GUI window through the use of a controller (autoresizing mask). The autoresizing mask determined how the position or size of object's frame should change when the GUI window changed. Subsequent modifications to the content or layout, however, result in a need to rewrite code, replace springs and struts, and/or modify the values for springs and struts so as to maintain the intended layout, spatial relationships between objects, etc.

The position of objects included in the layout as defined by springs and struts also presents a difficulty in aligning the edge of each object with a pixel for various window sizes. Rounding values of the position/size of the frame for each object provides only a partial solution for pixel alignment. This rounding may also result in a GUI window with multiple objects that, while intended to be laid out in a uniform manner, are laid out in a non-uniform manner due to, e.g., inconsistencies between rounding up and rounding down for the various positions or sizes.

SUMMARY OF THE DESCRIPTION

Exemplary methods, apparatuses, and systems include receiving user input to move, resize, or add a first user interface object to a first location in a user interface window that includes a second user interface object in a second location. In response to the user input to move, resize, or add the first user interface object, a plurality of constraints are automatically generated based upon the first location and the second location. The constraints define a size or a position of the first user interface object relative to the second user interface object and the first user interface object is displayed within the user interface according to the determined plurality of constraints.

In one embodiment, the plurality of constraints includes four constraints to define the size and position of the first user interface object. The generation of the plurality of constraints may include automatically identifying possible constraints and automatically selecting between constraints that redundantly define a position or size of the first user interface object. Additionally, the generation of the plurality of constraints may include automatically identifying possible constraints and automatically selecting between mutually exclusive constraints.

In one embodiment, one of the constraints is modified to have an edge of the first user interface object align with a pixel. The modifying may include rounding a value of the one of the plurality of constraints or adding a constant value to the one of the plurality of constraints.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
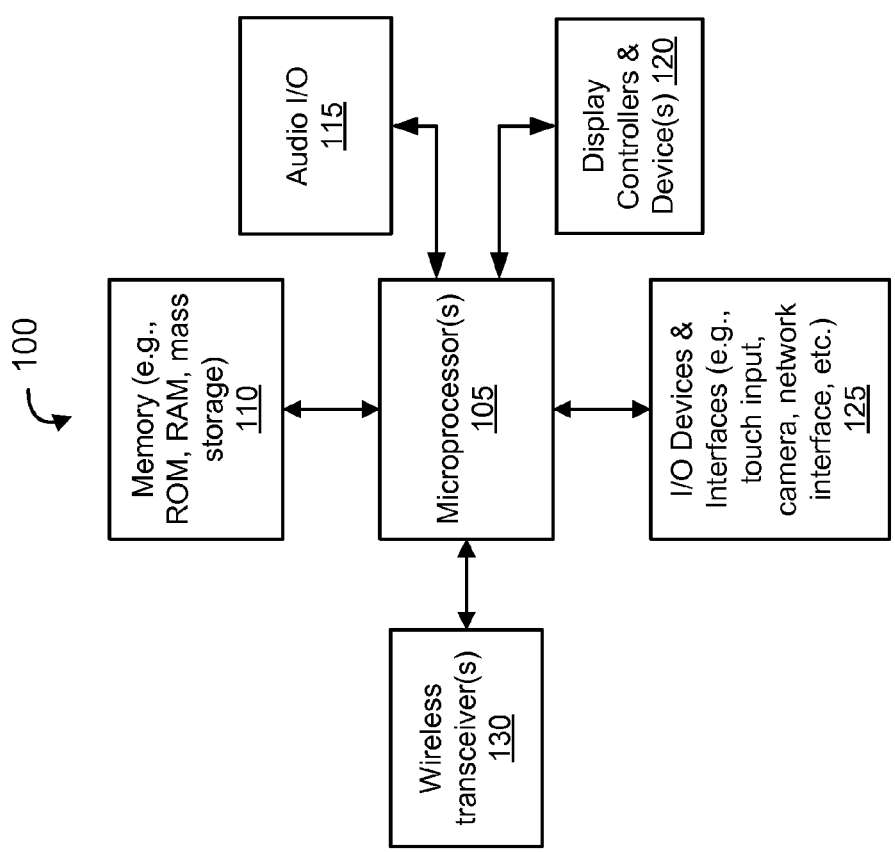
FIG. 1 illustrates, in block diagram form, an exemplary processing system that can manage rules applied to received email messages.

FIG. 1 illustrates, in block diagram form, an exemplary data processing system 100 that automate the layout of a graphical user interface, as described herein. Data processing system 100 may include one or more microprocessors 105 and connected system components (e.g., multiple connected chips) or the data processing system 100 may be a system on a chip.

The data processing system 100 includes memory 110 which is coupled to the microprocessor(s) 105. The memory 110 may be used for storing data, metadata, and programs for execution by the microprocessor(s) 105. The memory 110 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

The data processing system 100 also includes an audio input/output subsystem 115 which may include a microphone and/or a speaker for, for example, playing back music, providing telephone or voice/video chat functionality through the speaker and microphone, receiving voice instructions to be executed by the microprocessor(s) 105, playing audio notifications, etc.

A display controller and display device 120 provides a visual user interface for the user; this user interface may include a graphical user interface which, for example, is similar to that shown on a Macintosh computer when running Mac OS operating system software or an iPad, iPhone, or similar device when running iOS operating system software.

Data processing system 100 also includes one or more wireless transceivers 130, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses, may be used to interconnect the various components shown in FIG. 1.

The data processing system 100 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing system 100 may be a network computer or an embedded processing device within another device or consumer electronic product. As used herein, the terms "computer" and "apparatus comprising a processing device" may be used interchangeably with the data processing system 100 and include the above-listed exemplary embodiments.

The system 100 also includes one or more input or output ("I/O") devices and interfaces 125 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 100. The I/O devices and interfaces 125 may also include a connector for a dock or a connector for a USB interface, FireWire, Thunderbolt, Ethernet, etc. to connect the system 100 with another device, external component, or a network.

It will be appreciated that additional components, not shown, may also be part of the system 100, and, in certain embodiments, fewer components than that shown in FIG. 1 may also be used in a data processing system 100. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 110 or other machine-readable storage medium. The software may further be transmitted or received over a network (not shown) via a network interface device 125. In various embodiments, hardwired circuitry may be used in combination with the software instructions to implement the present embodiments. Thus, the techniques are not limited to any specific combination of hardware circuitry and software, or to any particular source for the instructions executed by the data processing system 100. As used herein, the term "computer" may refer to data processing system 100 and the various embodiments of data processing system 100 described above.

Figure 2:
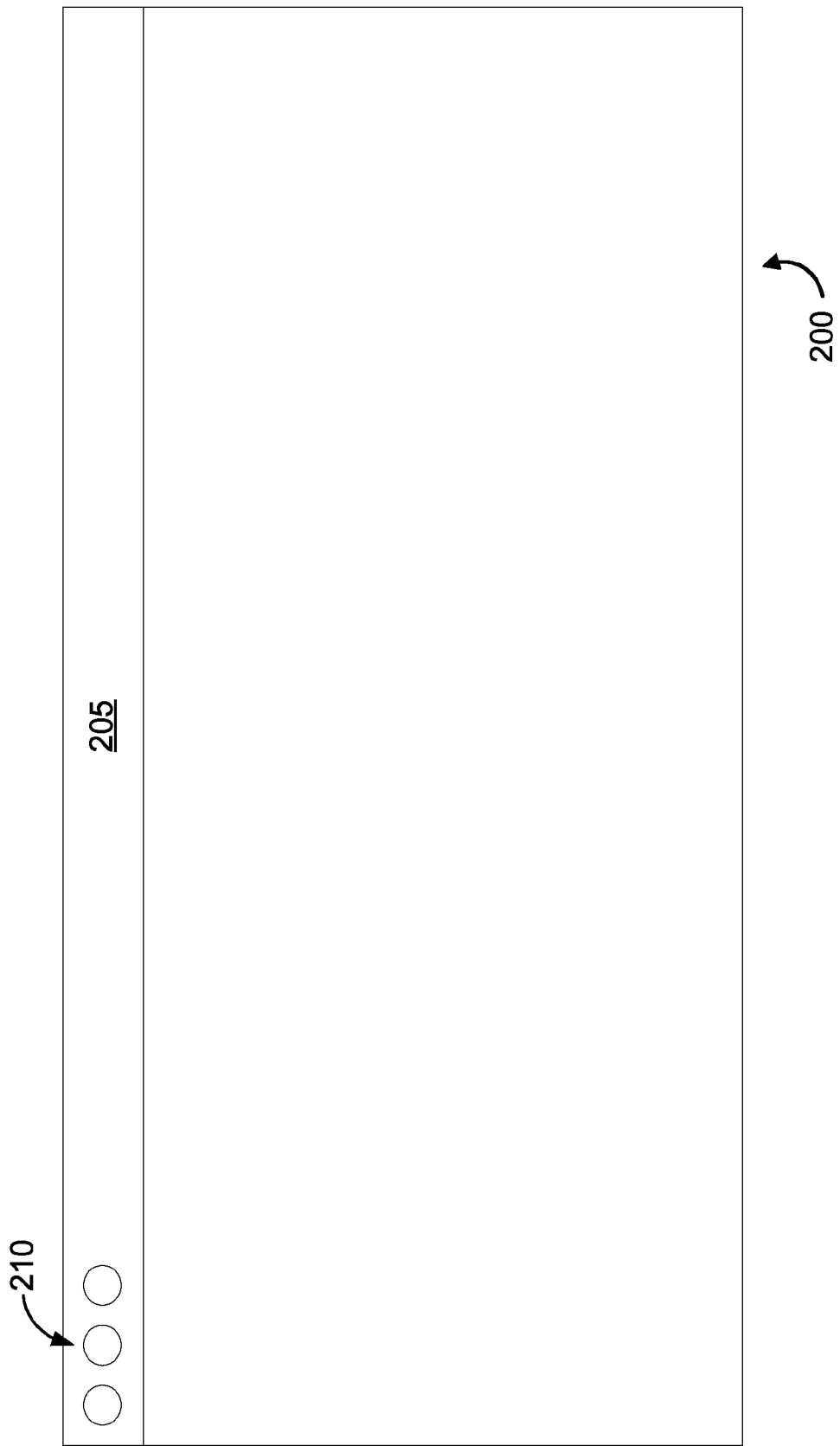
FIG. 2 illustrates an exemplary GUI window used in the design layout described herein.

FIG. 2 illustrates an exemplary GUI window 200 used in the design layout described herein. In one embodiment, the design layout is performed in a visual development environment, such as Interface Builder provided by Apple, Inc. In one embodiment, the GUI window 200 is selected from a template or palette of windows and includes default objects. For example, the illustrated GUI window 200 includes a header bar 205 and one or more control buttons 210. In an alternate embodiment, the GUI window 200 is generated with less, with more, or without default objects.

Figure 3:
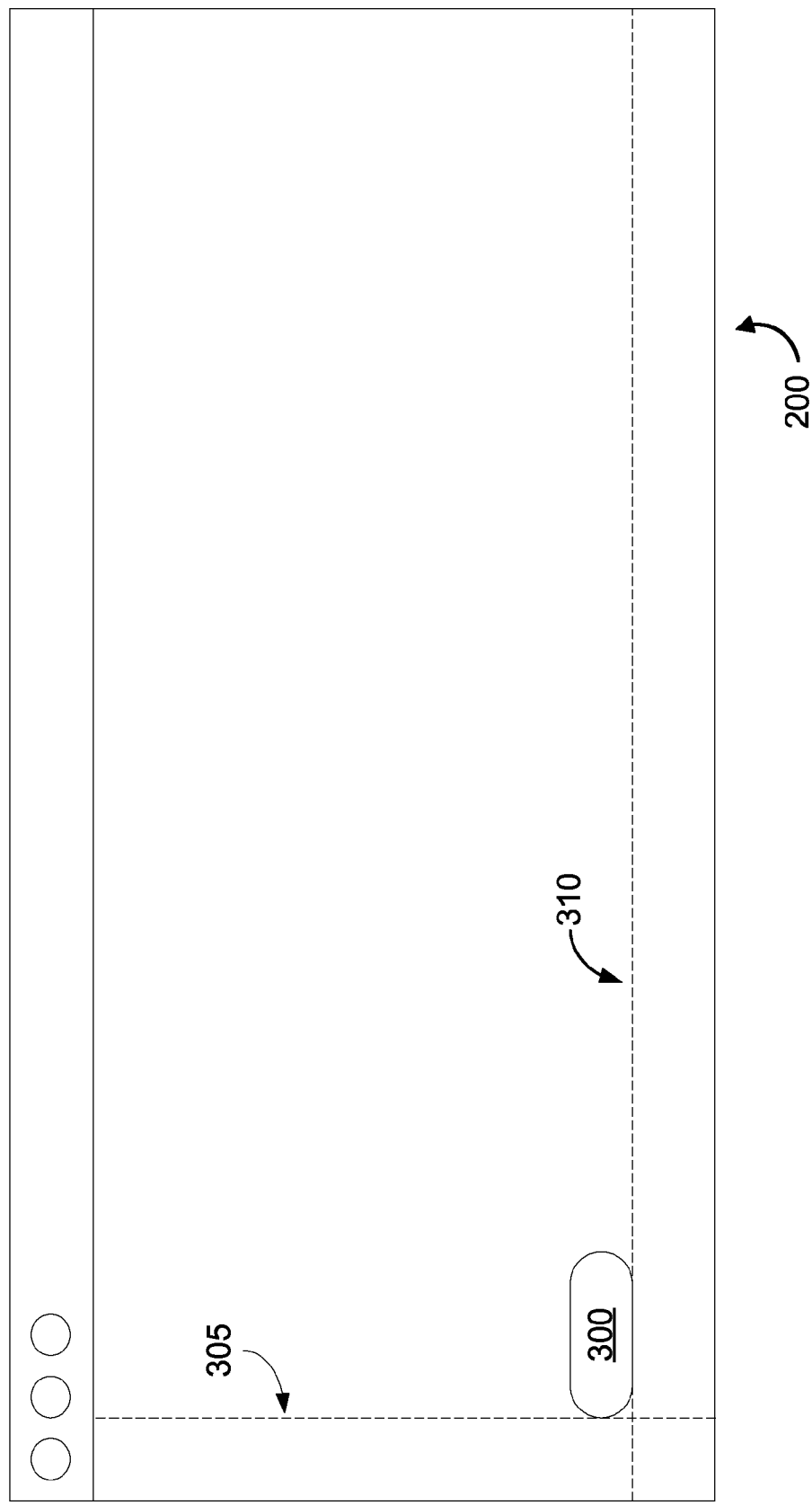
FIG. 3 illustrates the exemplary GUI window of FIG. 2 receiving input to add a user interface object.

FIG. 3 illustrates the exemplary GUI window 200 of FIG. 2 receiving input to add a user interface object 300. The illustrated user interface object 300 is a button. Other exemplary user interface objects include text input boxes, labels, tables, images, toolbars, drop-down menus, etc. In one embodiment, the user interface object 300 is selected from a template or palette of user interface objects. In alternate embodiment, a user creates the user interface object.

The illustrated exemplary GUI window 200 includes a vertical edge guide 305 and a horizontal edge guide 310. These guides may be displayed to assist the user in placing the button 300 within recommended distances from the vertical and horizontal edges of the GUI window 200, respectively, to meet predefined visual guidelines. In one embodiment, as the user drags the button 300 into a location near a guide 305/310, the button "snaps" into a position according to the recommended distance(s). Exemplary guides include distances between edges of user interface objects and edges of the edges of the GUI window 200, between an edge of one user interface object and the edge of another user interface object, the alignment of multiple user interface objects, a vertical or horizontal center position of a user interface object within the GUI window 200 or another user interface object, etc.

In one embodiment, the vertical edge guide 305 and a horizontal edge guide 310 are displayed during placement of the button 300 and prior to the button 300 being dropped into position. For example, a user may select the button 300 by way of point and click of the mouse, drag the button 300 onto the GUI window 200 by keeping the mouse button depressed while moving the cursor/selected button 300, and drop the button 300 into a position within the GUI window 200 by releasing the mouse button. Alternatively, the button 300 may be positioned using the keyboard, a touch interface, voice commands, or another form of input.

Figure 4:
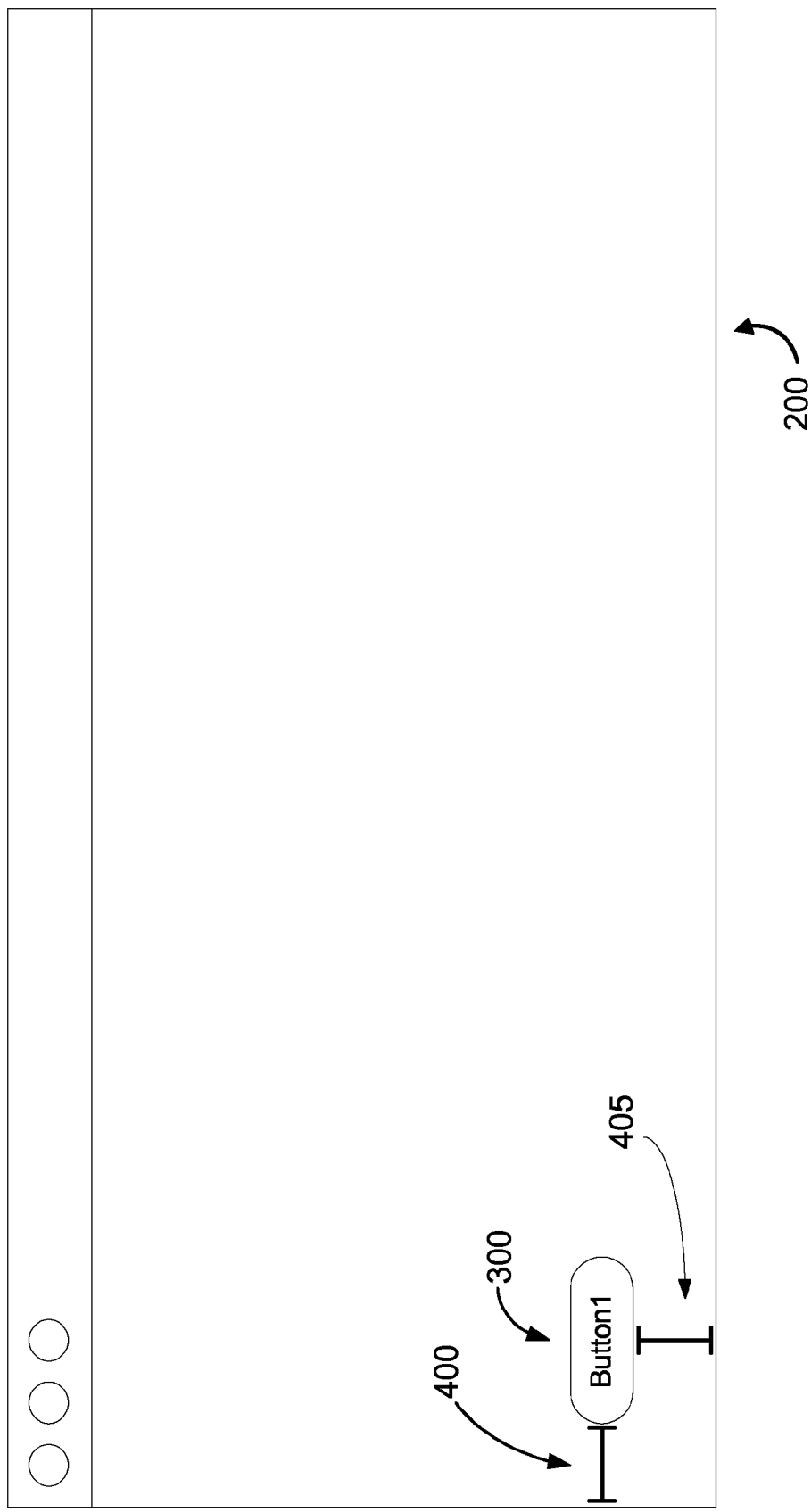
FIG. 4 illustrates the exemplary GUI window of FIG. 3 after the user interface object has been placed in a position within the GUI window.

FIG. 4 illustrates the exemplary GUI window 200 of FIG. 3 after the user interface object 300 has been placed in a position within the GUI window 200. The user interface object 300 has been given a title, Button1, which is displayed within the user interface object 300. In one embodiment, the vertical edge guide 305 and the horizontal edge guide 310 are no longer displayed and, instead, a horizontal placement constraint 400 and a vertical placement constraint 405 are illustrated.

In one embodiment, constraints are displayed when a user interface object is selected and hidden when the user interface object is not selected. Alternatively, constraints are displayed at all times. For the ease of explanation, constraints are illustrated in the figures when the illustration serves the purposes of explanation of the embodiments set forth herein (rather than to limit embodiments to the constraints being displayed or not displayed).

A constraint defines a position or size of a user interface object with respect to the GUI window 200 or with respect to another user interface object. The horizontal placement constraint 400 defines a horizontal positioning of the Button1 300 with respect to the left edge of the GUI window 200. The vertical placement constraint 405 defines a vertical position of the Button1 300 with respect to the bottom edge of the GUI window 200. In one embodiment, constraints may define position and/or size of a user interface object relative to a visual edge, title, or other displayed feature of the user interface object or another user interface object. Alternatively, constraints may define the position and/or size of the user interface object relative to an edge of the frame of the user interface object or an edge of the frame of another user interface object. The frame of a user interface object may not coincide with visual edges of the user interface object. For example, the frame may be a box that completely contains all of the drawing associated with an object, such as a "shadow" of the object.

In one embodiment, a constraint is defined using a linear equation in the form of $y=mx+b$. The values of x and y are defined by attributes of interface objects or the GUI window 200, m is a multiplier of the value of x (e.g., for scaling according to a ratio), and b is an offset or constant, e.g., a distance between objects, a width, etc. depending on the type of the constraint. In one embodiment, m and x are floating point values. Exemplary attributes include width, height, left, right, top, bottom, leading, trailing, and baseline of a user interface object or the GUI window 200, as applicable. For example, a linear equation defining the illustrated horizontal placement constraint 400 may use y=the left edge of the Button1 300 and x=the left edge of the GUI window 200. Additionally, the linear equation may be expressed as an inequality, e.g., $y \geq mx+b$, $y \leq mx+b$, $y > mx+b$, or $y < mx+b$.

In an alternate embodiment, a constraint is defined using a linear equation including more than two variables. An example of such a constraint is defined in the form of $y=(m0)(x0)+(m1)(x1)+\ldots+(mn)(xn)+b$, where x0 through xn and y are defined by attributes of interface objects, m0 through mn are multipliers (e.g., for scaling according to a ratio), and b is an offset or constant, e.g., a distance between objects, a width, etc. depending on the type of the constraint.

Figure 5:
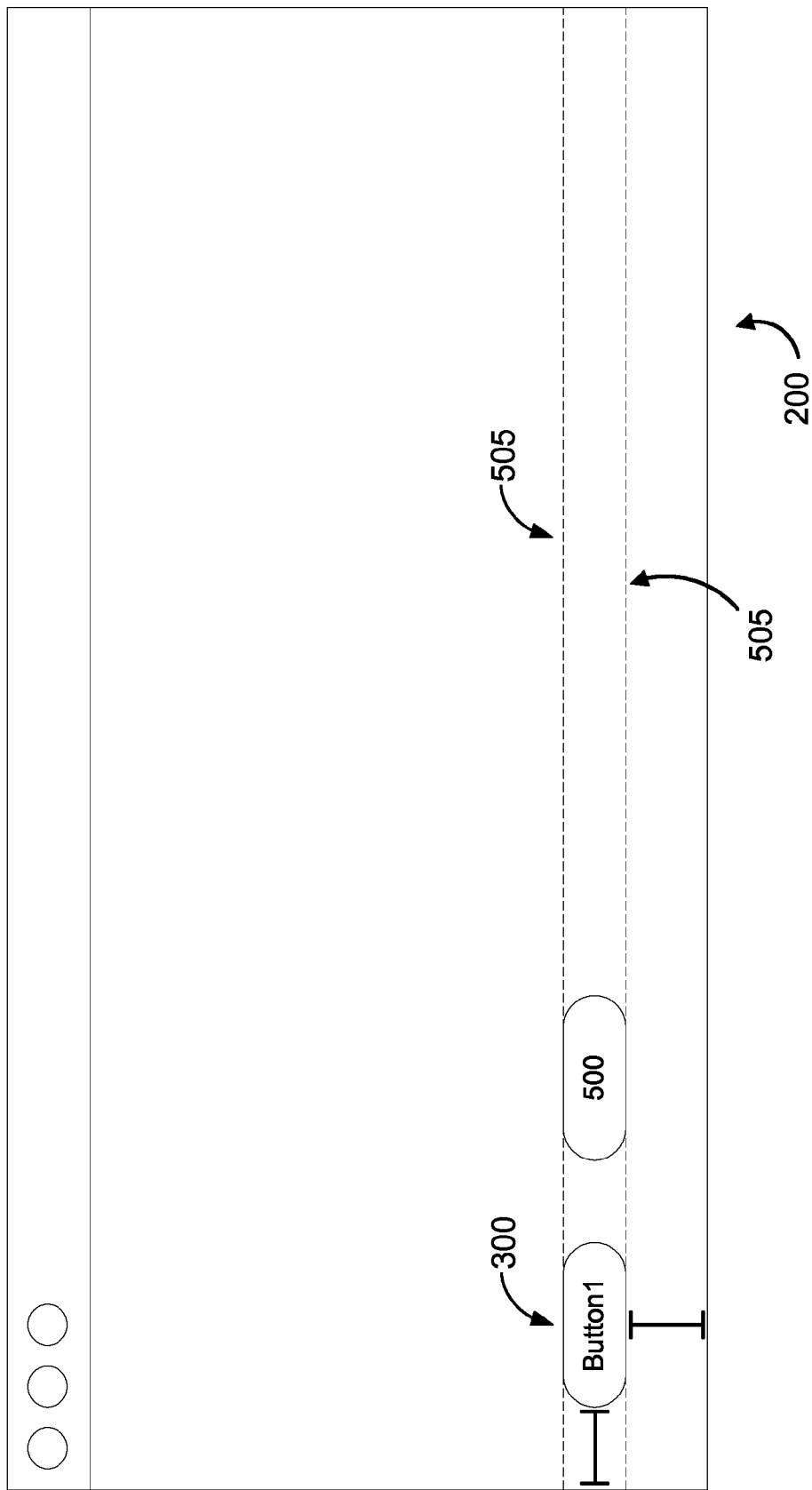
FIG. 5 illustrates the exemplary GUI window of FIG. 4 receiving input to add a second user interface object.

FIG. 5 illustrates the exemplary GUI window 200 of FIG. 4 receiving input to add a second user interface object 500. As the second user interface object 500 is dragged into the GUI window 200, various guidelines may be displayed. For example, if the second user interface object 500 is dragged near a position that would align with the Button1 300, guides 505 may be displayed to enable the user to align the two objects. In one embodiment, as the user drags the second user interface object 500 into a location near guides 505, the second user interface object 500 "snaps" into a position according to the aligned position. In one embodiment, the alignment of multiple user interface objects is based upon a visual edge of the user interface objects (e.g., an edge of an alignment rectangle, which may be inset from the frame of an object). Alternatively, the alignment of multiple user interface objects is based upon the content within the user interface objects (e.g., titles Button1 and a title for the second user interface object 500). Additionally, a guide may be displayed to show/snap to a recommended distance between the second user interface object 500 and the Button1 300.

Figure 6:
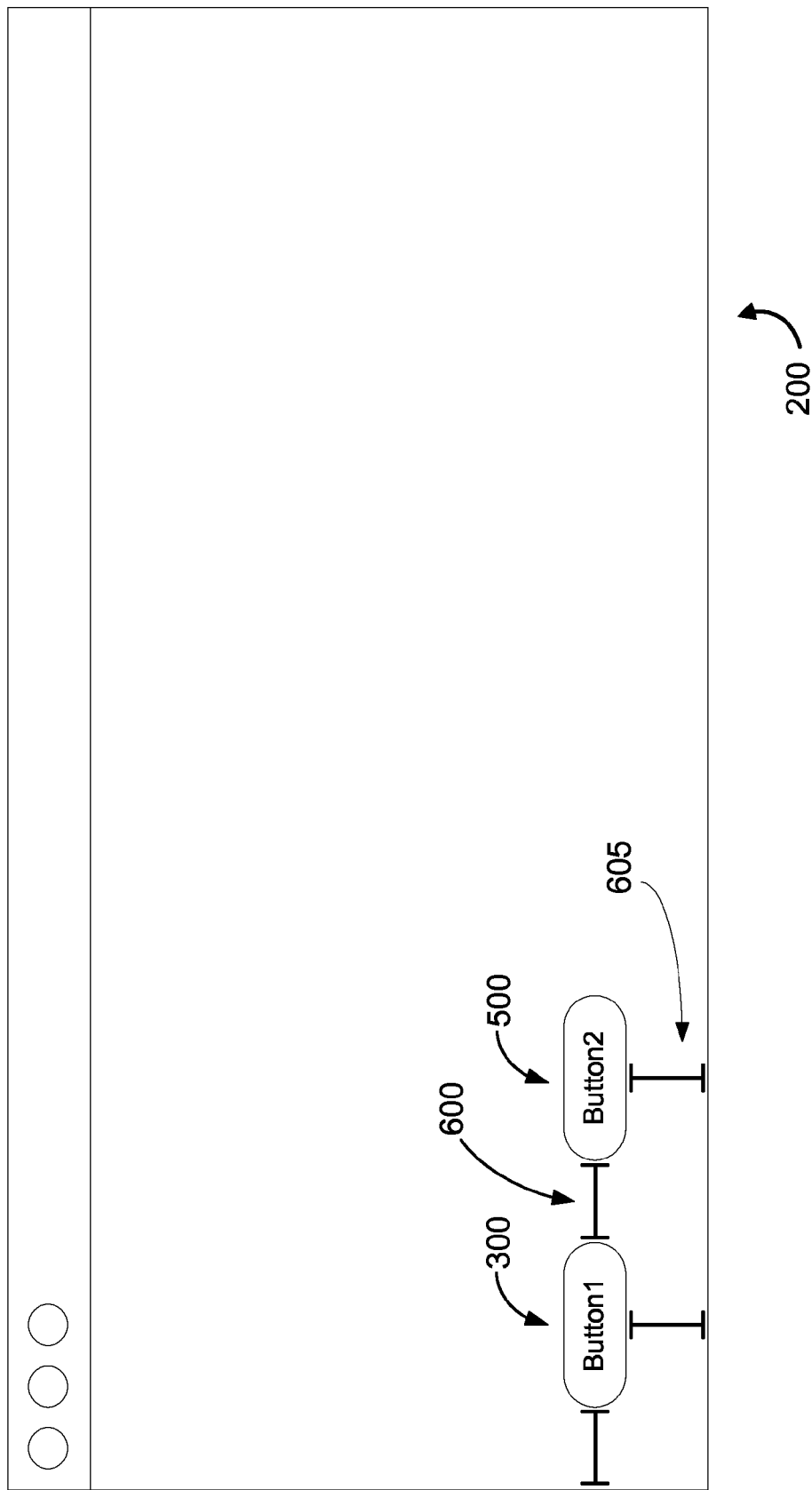
FIG. 6 illustrates the exemplary GUI window of FIG. 5 after the second user interface object has been placed in a position within the GUI window.

FIG. 6 illustrates the exemplary GUI window 200 of FIG. 5 after the second user interface object 500 has been placed in a position within the GUI window 200. The second user interface object 500 has been given a title, Button2, which is displayed within the second user interface object 500. In one embodiment, the guides 505 are no longer displayed and, instead, a horizontal placement constraint 600 and a vertical placement constraint 605 are illustrated. The vertical placement constraint 605 for the Button2 500 is similar to the vertical placement constraint 405 for Button1 300, in that the vertical placement constraint 605 defines the vertical position of Button2 500 with respect to the bottom edge of the GUI window 200. The horizontal placement constraint 600, however, defines the horizontal position of the Button2 500 with respect to the right edge of the Button1 300 rather than the left edge of the GUI window 200.

Figure 7:
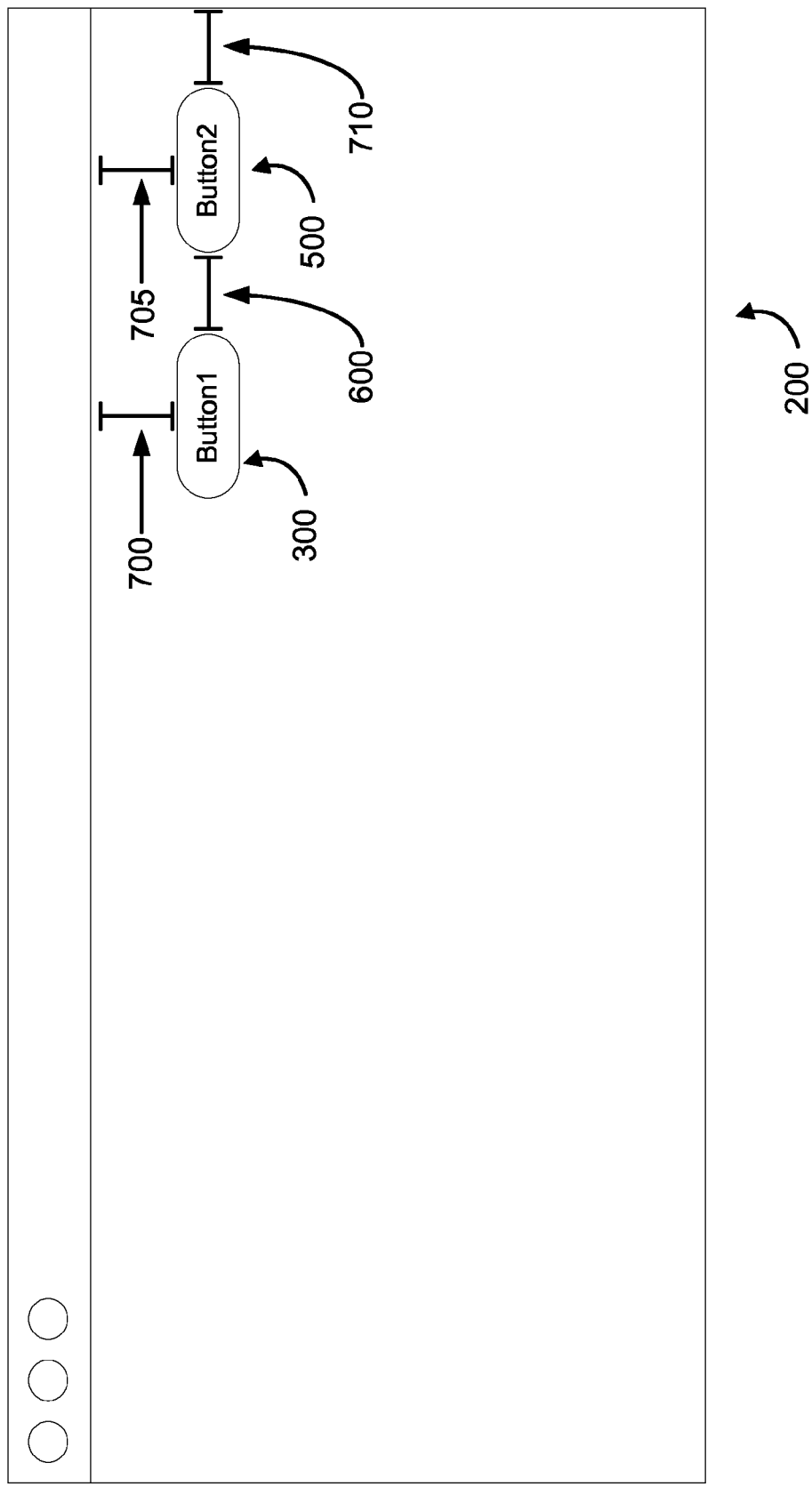
FIG. 7 illustrates the exemplary GUI window of FIG. 6 after the first and second user interface objects have been selected and moved to a new position within the GUI window.

FIG. 7 illustrates the exemplary GUI window 200 of FIG. 6 after Button1 300 and Button2 500 have been selected and moved to a new position within the GUI window 200. In one embodiment, when multiple user interface objects have a constraint defined with respect to one another and those user interface objects are selected and moved together, the constraint is maintained. For example, the horizontal placement constraint 600 defining the horizontal position of the Button2 500 with respect to the right edge of the Button1 300 was automatically generated in response to the addition of Button2 500 to the GUI window 200. When Button1 300 and Button 500 were selected and dragged from the bottom left corner of the GUI window 200 to the top right corner of the GUI window 200, the horizontal placement constraint 600 was maintained. In an alternate embodiment, after the exemplary move of Button1 300 and Button2 500, the horizontal placement constraint 600 now defines a horizontal position of Button1 300 relative to Button 2 500, rather than the horizontal position of Button2 500 relative to Button1 300.

Other constraints, may be automatically deleted, modified, and/or replaced with new constraints in response to a user modifying the layout of user interface objects. For example, horizontal placement constraint 400 for Button1 300, vertical placement constraint 405 for Button1 300, and vertical placement constraint 605 for Button2 500 have been automatically removed and replaced with horizontal placement constraint 710 for Button2 500, vertical placement constraint 700 for Button1 300, and vertical placement constraint 705 for Button2 500. The automatic determination of removing and adding constraints based upon the positions of user interface objects will be described in greater detail below.

In one embodiment, vertical edge and horizontal edge guides may be displayed with reference to the top and right edges of the GUI window 200 when Button1 300 and Button 500 were selected and dragged from the bottom left corner of the GUI window 200 to the top right corner of the GUI window 200 in a fashion similar to the vertical edge and horizontal edge guides described with reference to FIG. 3.

Figure 8:
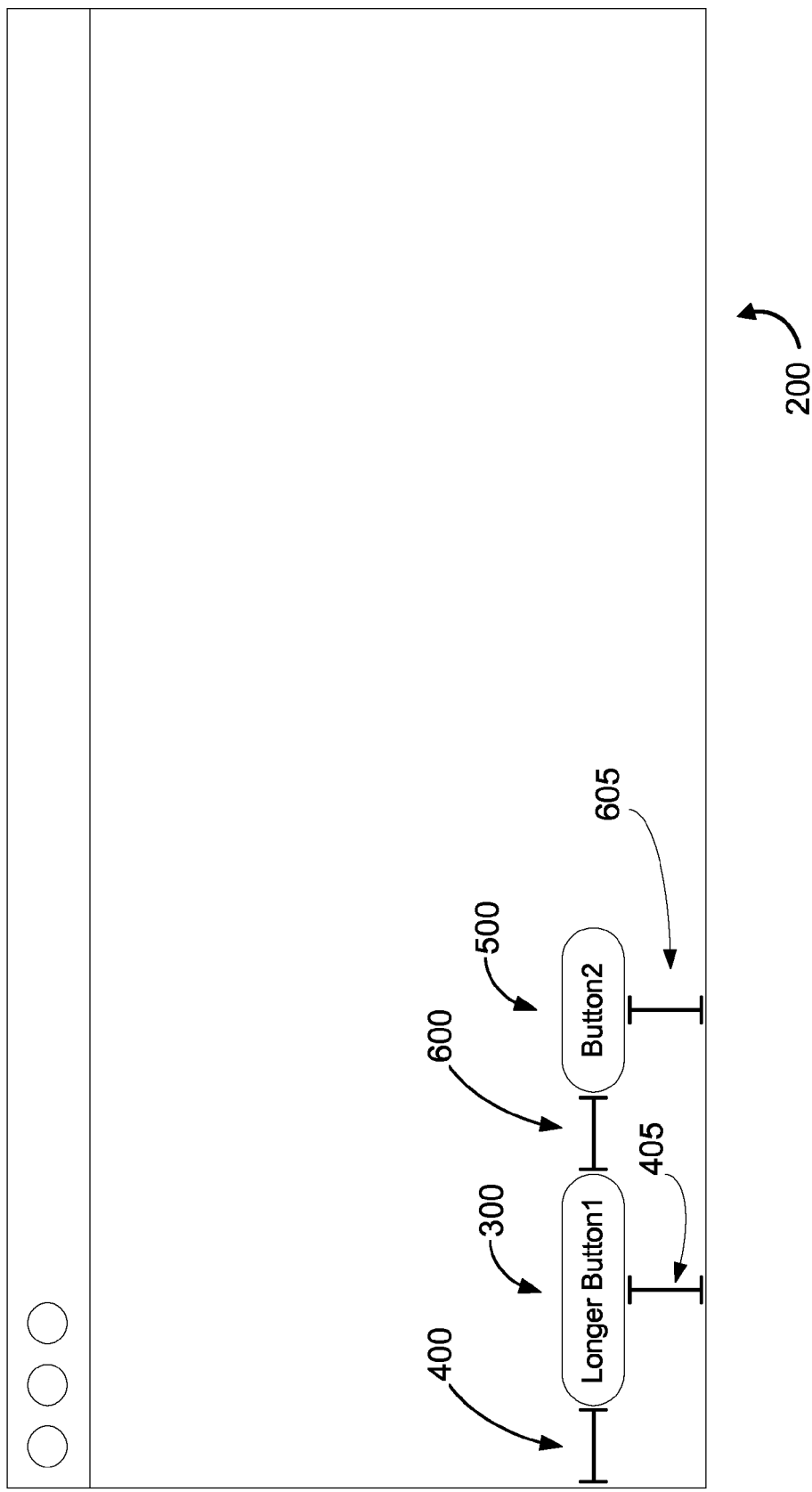
FIG. 8 illustrates the exemplary GUI window of FIG. 6 after the content of the first user interface object has increased in length.

FIG. 8 illustrates the exemplary GUI window 200 of FIG. 6 after the name of Button1 300 has been changed to Longer Button1. In one embodiment, user interface objects declare their own preferred size or position based upon constraints. For example, the size of the user interface object 300 is defined with respect to the content within the user interface object 300. The size of the user interface object 300 based upon the old content (e.g., title/name) "Button1" is automatically adjusted to accommodate the size of the new content "Longer Button1" in response to a change of the content.

In one embodiment, a constraint for a minimum width of a user interface object is set allow content within the user interface object to be truncated when the user interface object is resized. Alternatively, a restraint for the minimum width may be set to prevent truncation. In one embodiment, whether or not truncation or compression of content is permitted in varying circumstances is defined by priority values set for each restraint, which will be described in greater detail below.

Additionally, as a result of the change of size of the user interface object 300, the right edge of the user interface object 300 has changed position within the GUI window 200. The left edge of the user interface object 300 has remained in the same position as defined by the horizontal placement constraint 400. In maintaining the horizontal placement constraint 600 that defines the horizontal position of the left edge of Button2 with respect to the right edge of the user interface object 300, Button2 500 is automatically moved to the right in response to the larger size of Longer Button1 300. As a result, simple modifications can be made to a user interface object and the necessary changes to the positions of surrounding user interface objects can be automatically made. For example, if the names of buttons were translated into another language that required larger buttons to accommodate all of the text (e.g., as may be the case in translating from English to German), the language translation would serve to update the GUI window 200 without the need for a user to redesign the layout of the GUI window 200.

Given that the change of content of Longer Button1 300 only resulted in a change in length in this example, and not a change in height, the vertical placement constraints 405 and 605 remain unchanged and continue to define the vertical positions of the bottom of each user interface object 300 and 500 with respect to the bottom edge of the GUI window 200.

Figure 9:
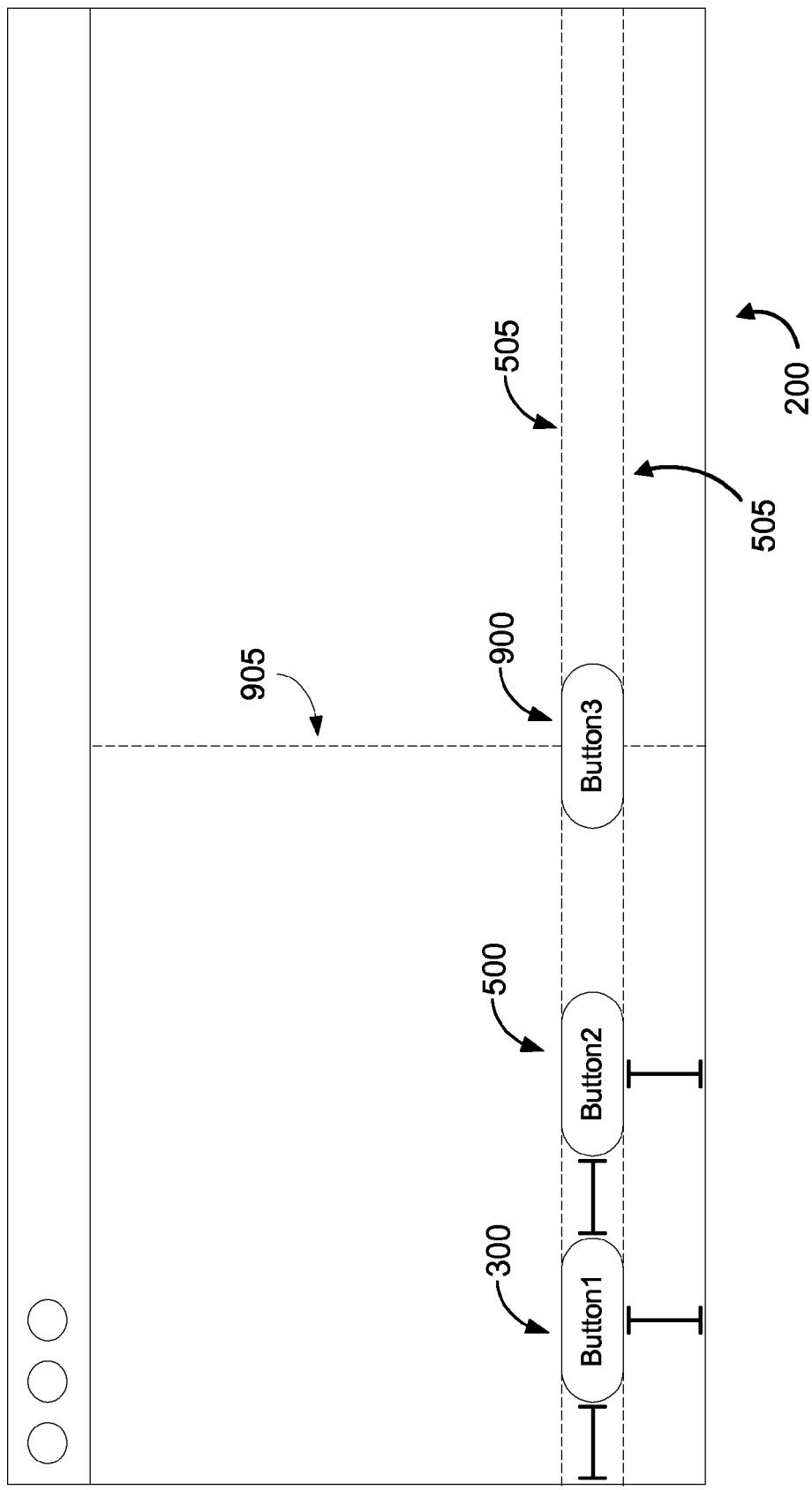
FIG. 9 illustrates the exemplary GUI window of FIG. 6 receiving input to add a third user interface object.

FIG. 9 illustrates the exemplary GUI window 200 of FIG. 6 receiving input to add a third user interface object 900. Similar to the description above, alignment guides 505 may be displayed to enable the user to align the third user interface object 900 with Button1 300 and Button2 500. Additionally, a horizontal center guide 905 may be displayed to indicate and/or snap the third user interface object 900 to a horizontally centered position within the GUI window 200.

Figure 10:
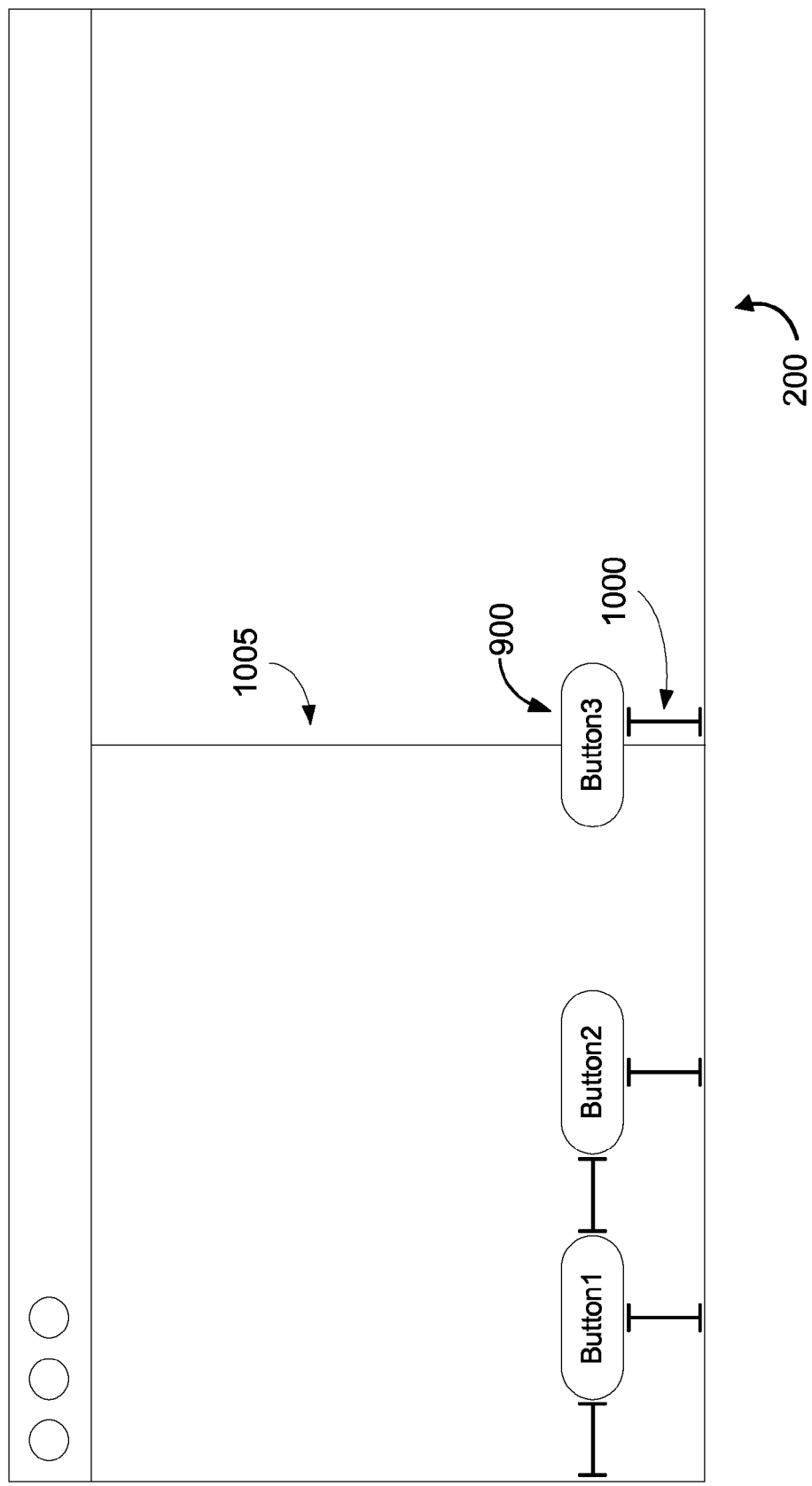
FIG. 10 illustrates the exemplary GUI window of FIG. 9 after the third user interface object has been placed in a position within the GUI window.

FIG. 10 illustrates the exemplary GUI window 200 of FIG. 9 after the third user interface object 900 has been placed in a position within the GUI window 200. The third user interface object 900 has been given a title, Button3, which is displayed within the third user interface object 900. Similar to the description above, the guides 505 are no longer displayed and, instead, a horizontal placement constraint 1005 and a vertical placement constraint 1000 are illustrated. The vertical placement constraint 1000 for the Button3 900 is similar to the vertical placement constraints for Button1 300 and Button2 500, in that the vertical placement constraint 1000 defines the vertical position of Button3 900 with respect to the bottom edge of the GUI window 200. The horizontal placement constraint 1005, however, defines the horizontal position of the Button3 900 with respect to the center of the GUI window 200.

Figure 11:
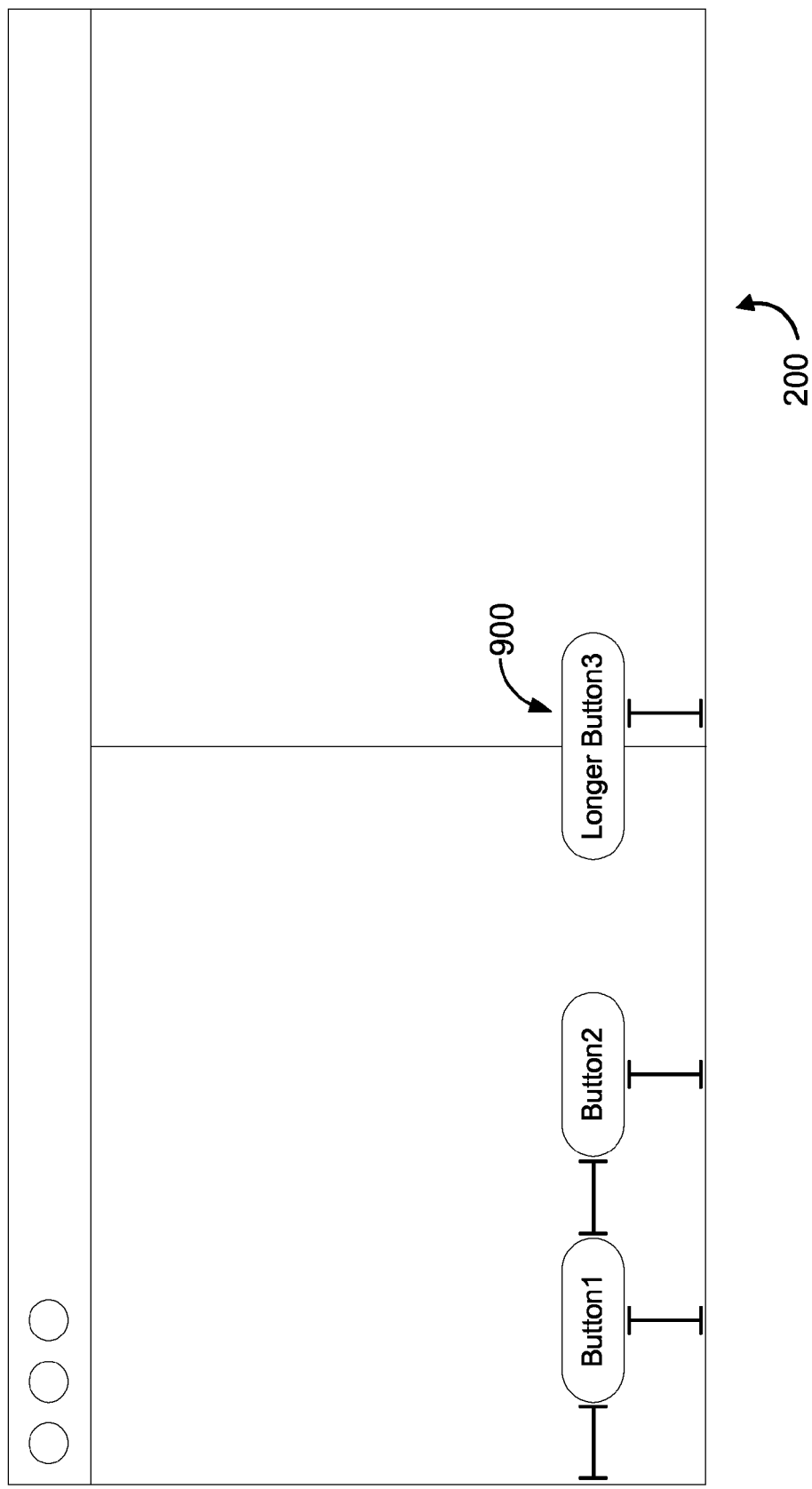
FIG. 11 illustrates the exemplary GUI window of FIG. 10 after the content of the third user interface object has increased in length.

FIG. 11 illustrates the exemplary GUI window 200 of FIG. 10 after the name of Button3 900 has been changed to Longer Button3. Similar to the embodiment described above, user interface objects declare their own preferred size based upon constraints. The size of the user interface object 900 is defined with respect to the content within the user interface object 900. The size of the user interface object 900 based upon the old content (e.g., title/name) "Button3" is automatically adjusted to accommodate the size of the new content "Longer Button3" in response to a change of the content. While the length of user interface object 900 has increased, the horizontal position of user interface object 900 is maintained in the center of the GUI window according to the horizontal placement constraint 1005 generated upon the initial placement of the user interface object 900. Accordingly, the left and right edges of the user interface object 900 are moved equally or substantially equally away from one another to accommodate the new content.

Figure 12:
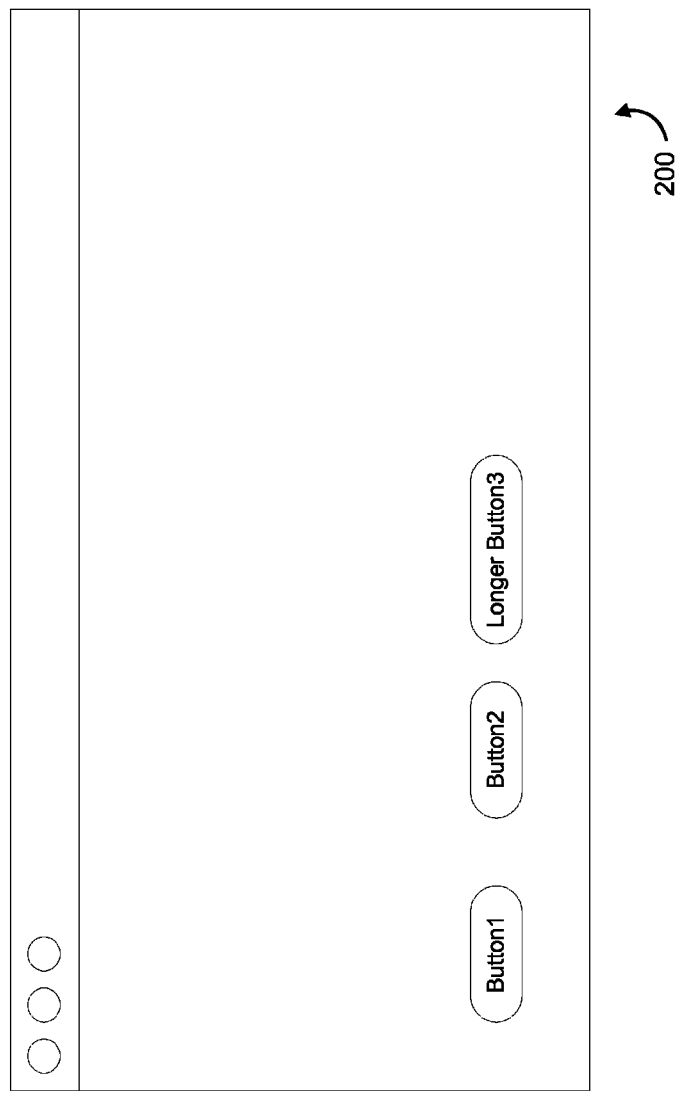
FIG. 12 illustrates an active simulation of the exemplary GUI window of FIG. 11 *n* which the GUI window is resized to a smaller width.

FIG. 12 illustrates an active simulation of the exemplary GUI window 200 of FIG. 11. The illustrated simulation includes the resizing of the GUI window 200 to a smaller width. The various constraints described above define the positions of Button1, Button2, and Longer Button3. For example, Button1, Button2, and Longer Button3 all maintain their respective distances from the bottom edge of the GUI window 200 based upon the corresponding vertical placement constraints 405, 605, and 100. Button1 maintains the defined distance from the left edge of the GUI window 200 based upon the horizontal placement constraint 400. Button2 maintains the defined distance from the left edge of the Button1 based upon the horizontal placement constraint 600.

Button3 maintains a horizontal center position with respect to the GUI window 200 based upon the horizontal placement constraint 1005. Given that the width of the GUI window 200 has decreased, Button3 has moved closer in horizontal placement to Button2 to remain in the horizontal center of the GUI window 200 according to the horizontal placement constraint 1005.

Figure 13:
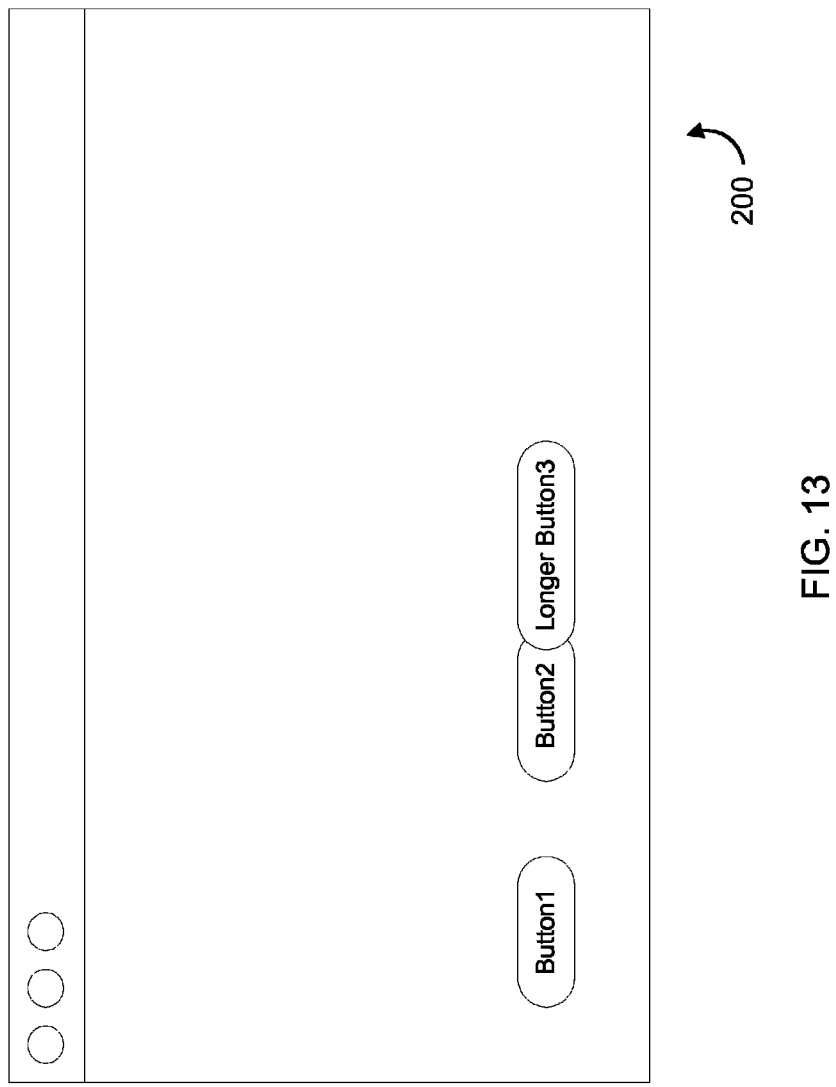
FIG. 13 illustrates the active simulation of the exemplary GUI window of FIG. 12 in which the GUI window is resized to yet a smaller width.

FIG. 13 illustrates the active simulation of the exemplary GUI window 200 of FIG. 12 in which the GUI window 200 is resized to yet a smaller width. The various constraints described above continue to define the positions of Button1, Button2, and Longer Button3. The horizontal placement constraint 1005, while keeping Button3 in a horizontal center position with respect to the GUI window 200 results in Button3 overlapping with Button2. The overlapping of user interface objects may not be desirable and, in one embodiment, can be corrected by manually adding an additional constraint.

Figure 14:
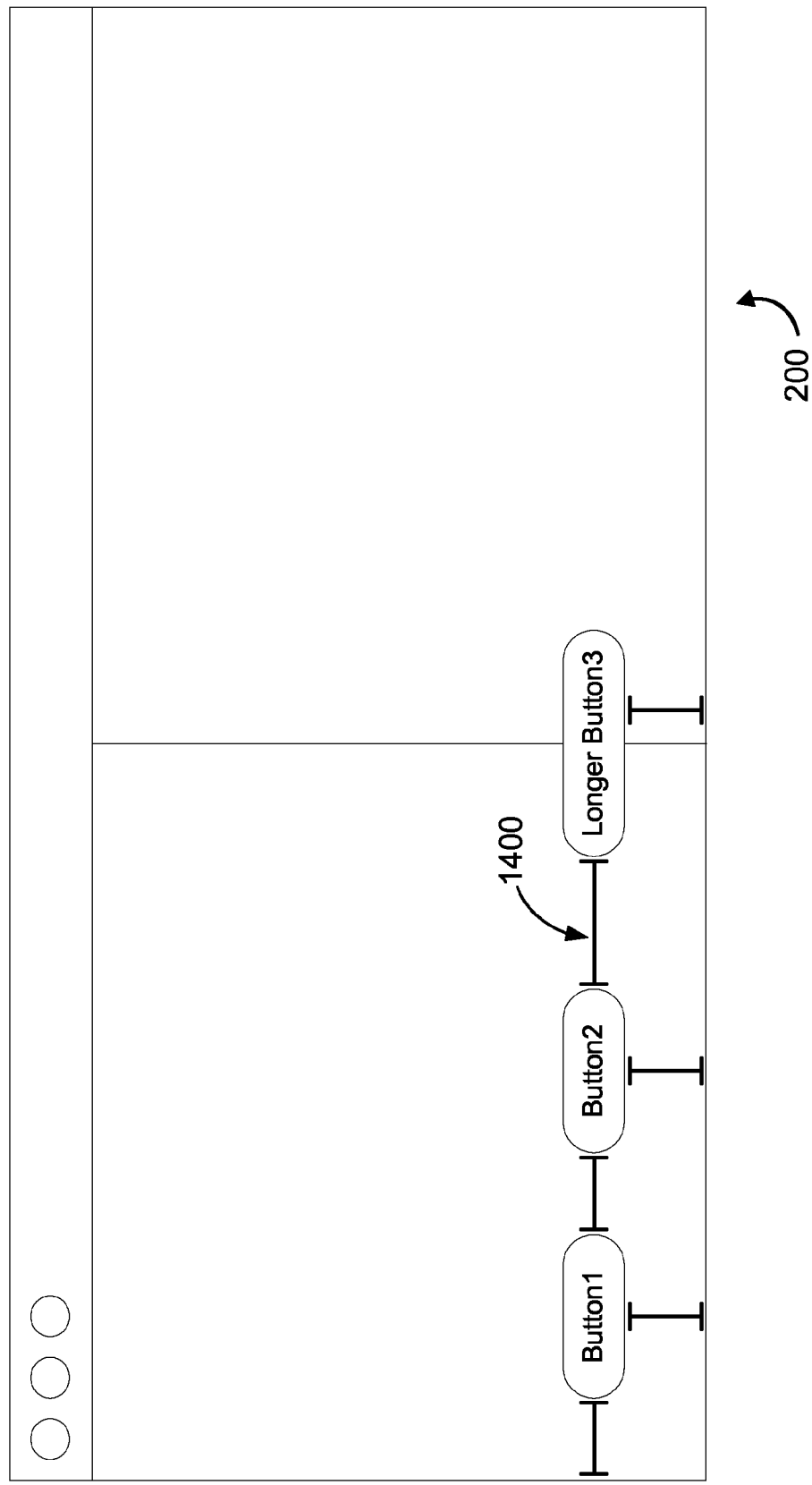
FIG. 14 illustrates the exemplary GUI window of FIG. 11 after an additional constraint has been added to define a positional relationship between the second and third user interface objects.

FIG. 14 illustrates the exemplary GUI window 200 of FIG. 11 after an additional constraint 1400 has been added to define a positional relationship of the left edge of Longer Button3 with respect to the right edge of Button2 (or vice versa). For example, the additional constraint 1400 may be added by selecting Button2 and Longer Button3 and selecting a menu option to add a constraint. Based upon the positional relationship between the two user interface objects (the buttons are positioned side by side), an exemplary embodiment automatically determines that the additional constraint to be between the left edge of Longer Button3 and the right edge of Button2.

As described above, a constraint may be defined as an inequality. For example, the additional constraint 1400 may set a minimum distance to maintain between the left edge of Longer Button3 and the right edge of Button2. As the window is resized, Longer Button3 will move to satisfy the horizontal placement constraint 1005 and keep Button3 in a horizontal center position with respect to the GUI window 200. Should the window be resized to a certain point, however, the minimum distance defined by the horizontal placement constraint 1400 will prevent Longer Button3 from overlapping Button2, as in the example illustrated in FIG. 13. The minimum distance may be defined by the horizontal placement constraint 1400 is defined by a value entered by a user or a default value based upon the distance defined by the current layout. In one embodiment, the value is a numerical value entered by the user in a text input box. Alternatively, the value may be set (e.g., via a check box or default value) to a recommended guideline value (e.g., an interface guideline defining a recommended minimum distance between objects).

In one embodiment, the recommended guideline value is a defined using a symbolic constant value that may be changed over time (e.g., in response to a software update). For example, the recommended distance between two objects may change between versions of an operating system. If the symbolic constant value is updated in the newer version of the operating system, locations of objects in a graphical user interface window designed based upon the previous operating system are adjusted based upon the new recommended distance. Alternatively, the recommended guideline value is a static value.

Figure 15:
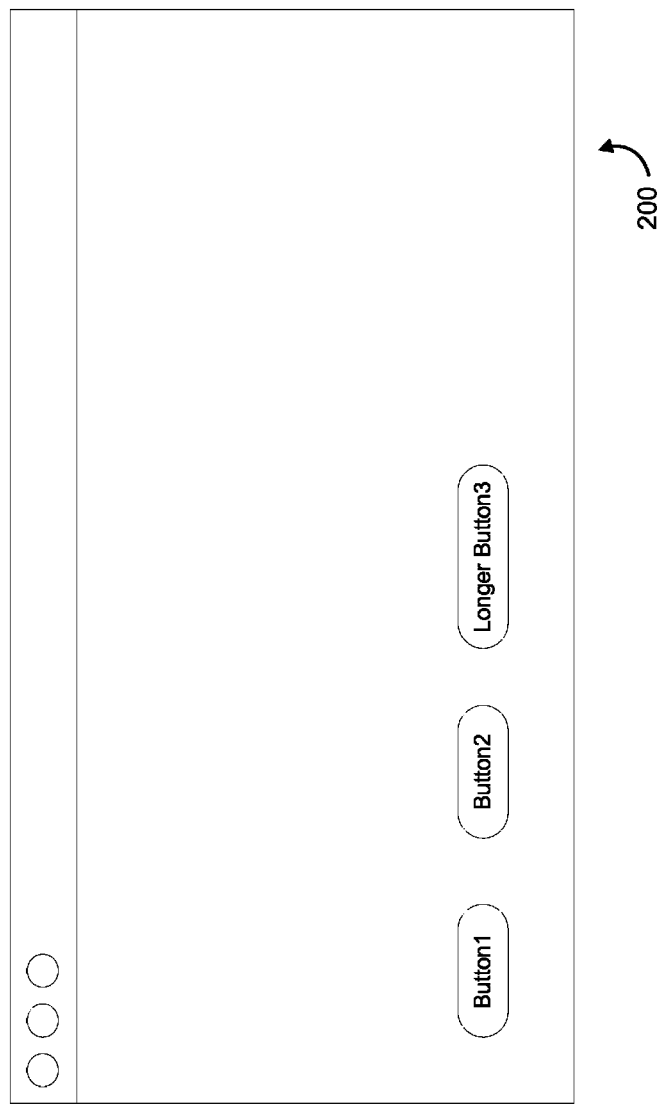
FIG. 15 illustrates an active simulation of the exemplary GUI window of FIG. 14 in which a minimum width of the GUI window has been implicitly defined by the constraints that correspond to user interface objects within the GUI window.

FIG. 15 illustrates an active simulation of the exemplary GUI window 200 of FIG. 14. In this example, the GUI window 200 has been resized to a smaller width and reached the minimum distance defined by the horizontal placement constraint 1400. Given that Longer Button3 is constrained to remain in horizontal center position with respect to the GUI window 200 and cannot move further to the left as a result of the horizontal placement constraint 1400 (and given the constraints 400 and 600 that define the horizontal positions of Button1 and Button2, respectively), the GUI window 200 cannot be resized to a smaller width. In order to satisfy all of the constraints, a minimum width for the GUI window 200 has been implicitly defined (without the user explicitly defining a minimum width for the GUI window 200).

In one embodiment, priority values are attributed to constraints. Priority values define an order of preference for satisfying the constraints for the GUI window 200 when less than all constraints can be satisfied. In the example above, an implicit minimum width of the GUI window 200 was automatically defined as a constraint because, otherwise, not all constraints could be satisfied below a certain minimum width of the GUI window 200. In other words, all of the horizontal placement constraints are of equal priority. If a certain size of the GUI window 200 would cause two constraints to be in conflict, priority values may be used to determine which constraint to satisfy and which constraint to disregard for that window size. For example, if the horizontal placement constraint 1005 for centering Longer Button3 has a lower priority value (e.g., than other horizontal placement constraints, minimum window width, etc.), the implicit minimum width of the GUI window 200 will not be defined by Longer Button3 being positioned in the center of the GUI window 200 at all times and the GUI window 200 can be resized to a smaller width than the example illustrated in FIG. 15. In one embodiment, constraints are expressed as floating point values.

Figure 16:
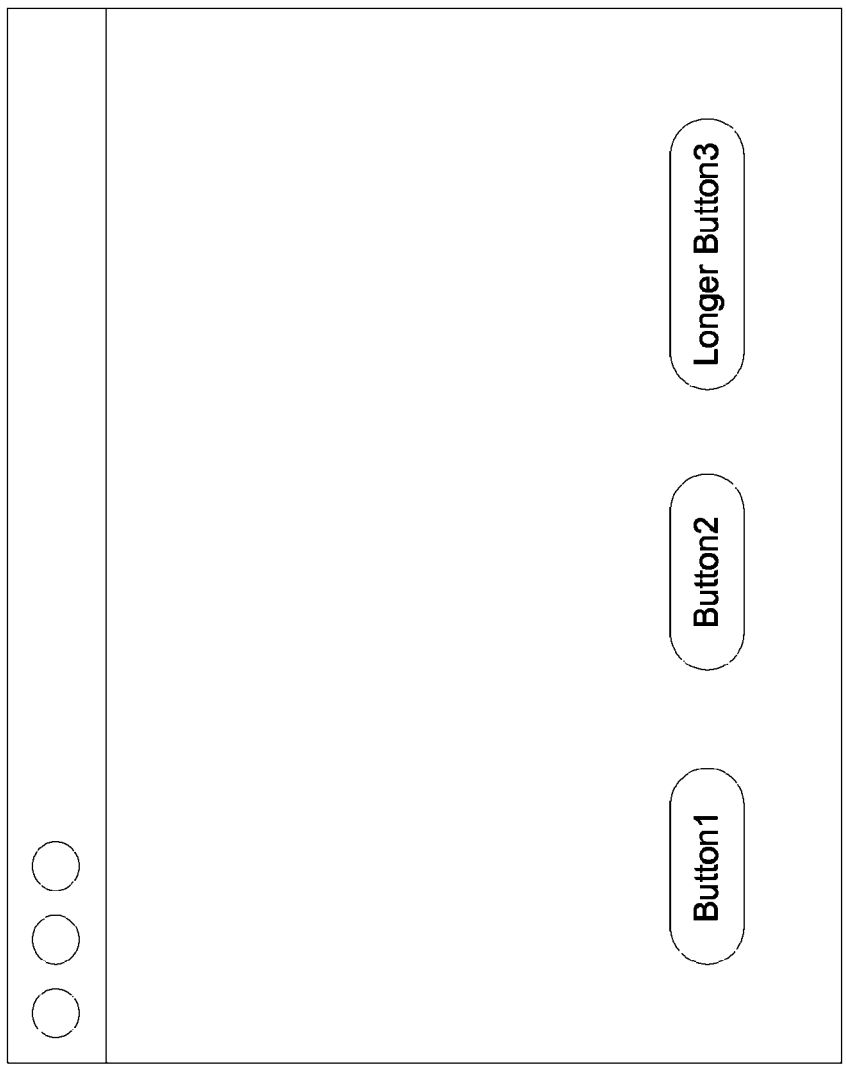
FIG. 16 illustrates an active simulation of the exemplary GUI window of FIG. 14 in which a priority for a horizontal placement constraint has been set to a lower value.

FIG. 16 illustrates an active simulation of the exemplary GUI window 200 of FIG. 14 in which a priority for the horizontal placement constraint 1005 has been set to a lower value. As the GUI window is resized from, e.g., the width shown in FIG. 14, to successively smaller widths, Longer Button3 moves horizontally to the left. For GUI window widths between the width shown in FIG. 14 and the width shown in FIG. 15, Longer Button3 remains in a horizontally centered position within the GUI window 200. Less than all of the horizontal placement constraints can be satisfied for GUI window widths less than the width shown in FIG. 15. If the horizontal placement constraint 1005 for centering Longer Button3 has a lower priority value, the implicit minimum width of the GUI window 200 will not be defined by Longer Button3 being positioned in the center of the GUI window 200 at all times and the GUI window 200 can be resized to a smaller width as shown in FIG. 16.

Figure 17:
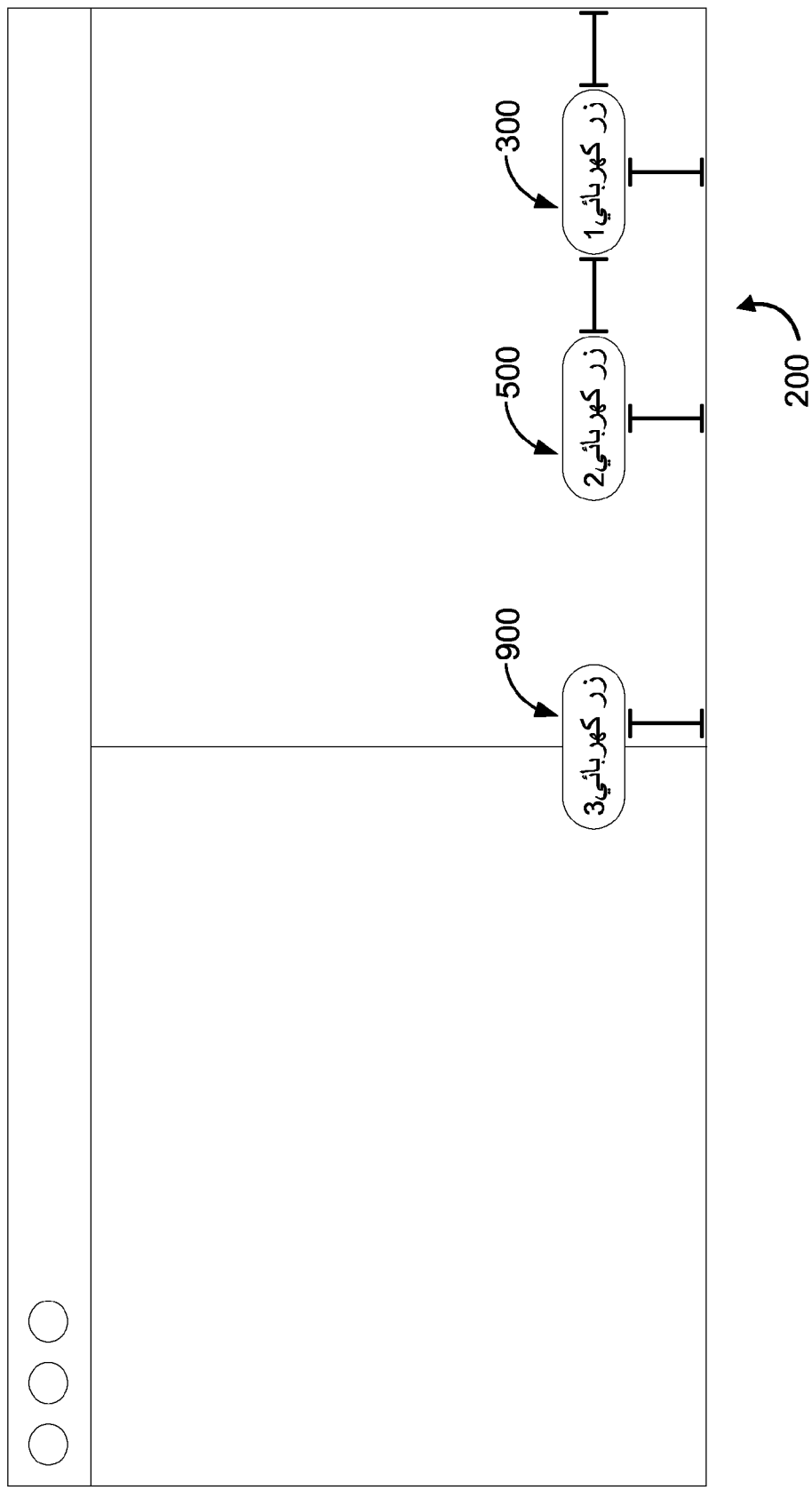
FIG. 17 illustrates the exemplary GUI window of FIG. 10 after a language localization update.

FIG. 17 illustrates the exemplary GUI window 200 of FIG. 10 after a language localization update. As discussed above, exemplary constraint attributes include leading and trailing. As used herein, leading and trailing attributes refer to right and left or left and right, respectively, depending upon a selected or default preference. For example, for languages that read from left to right, the preference may be set to treat leading as left and trailing as right. If, however, a language that reads from right to left were used, the preference may be set to treat leading as right and trailing as left. The use of leading and trailing enables a designed GUI to easily switch between varying language localization preferences.

For example, the GUI window 200 of FIG. 10 includes English language titles, so a preference may be set to treat leading as left and trailing as right. If the horizontal placement constraints 400 and 600 are defined on leading and trailing edges of the GUI window 200, user interface object 300, and user interface object 500 (rather than strictly to right or left edges) the horizontal position of user interface object 300 and user interface object 500 may be automatically changed in response to changing the values of leading and trailing from left and right to right and left. As a result, an update of a layout from English as shown in FIG. 10 to Arabic as shown in FIG. 17, would involve language translation and switching the values of leading and trailing. The corresponding mirroring of user interface object placement occurs automatically and reworking of the layout is not required. For example, the horizontal placement constraint 400 that defines the horizontal positioning of user interface object 300 using a distance between the leading/left edge of the GUI window 200 and the leading/left edge of the user interface object 300 in FIG. 10 is changed, in response to changing the values of leading and trailing, to define the horizontal positioning of user interface object 300 using a distance between the leading/right edge of the GUI window 200 and the leading/right edge of the user interface object 300 in FIG. 17. Similar changes are made for horizontal placement constraint 600 for user interface object 500.

Figure 18:
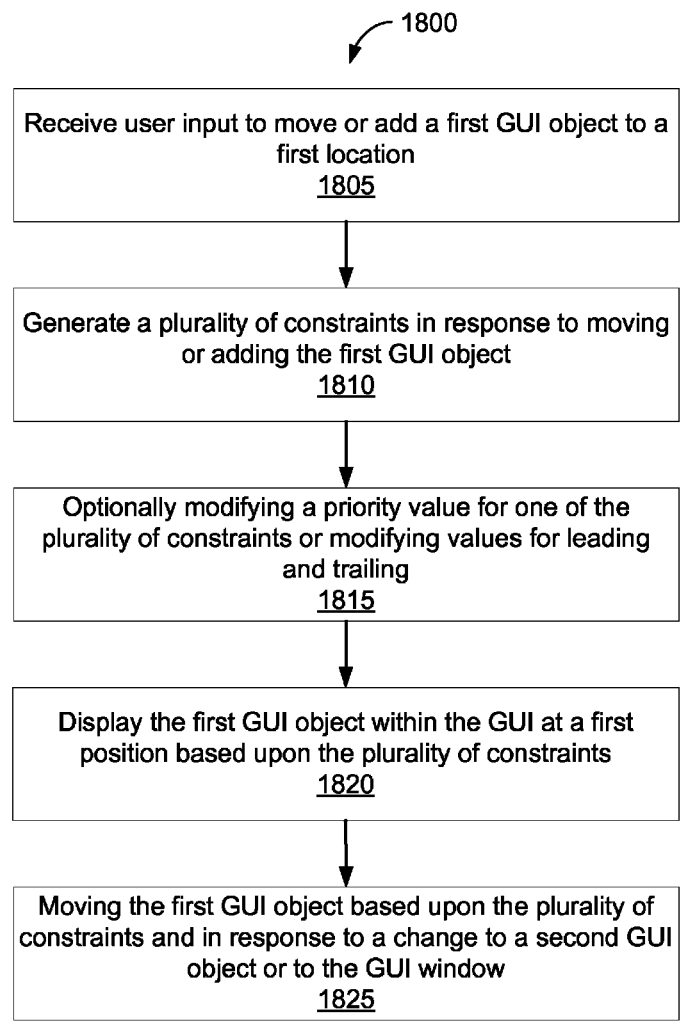
FIG. 18 is a flow chart that illustrates an exemplary method of automating portions of a graphical user interface layout.

FIG. 18 is a flow chart that illustrates an exemplary method 1800 of automating portions of a graphical user interface layout. At block 1805, a computer implementing a layout design tool receives user input to move, resize, or add a first user interface object to a first location within a GUI window, e.g., as described with reference to FIG. 3.

At block 1810, the computer automatically generates a plurality of constraints in response to the moving or addition of the first user interface object. In one embodiment, the user interface window includes a second user interface object in a second location, the plurality of constraints are based upon the first location and the second location, and the constraints define the size and/or position of the first user interface object relative to the second user interface object (e.g., as described with reference to FIGS. 2-6). The generation of the plurality of constraints will be described in greater detail below.

At block 1815, the computer may optionally receive one or more inputs to set or modify a priority value for one of the plurality of constraints (e.g., as described above with reference to FIG. 16) or values for leading and trailing attributes (e.g., as described above with reference to FIG. 17). At block 1820, the computer simulates or runs underlying program code to display the GUI window including the first user interface object according to the plurality of constraints. At block 1825, the computer moves the first user interface object to a third location based upon the plurality of constraints and in response to receiving user input to move or resize the second object (e.g., as described with reference to FIG. 8) or to resize the user interface window (e.g., as described with reference to FIGS. 12-15).

Figure 19:
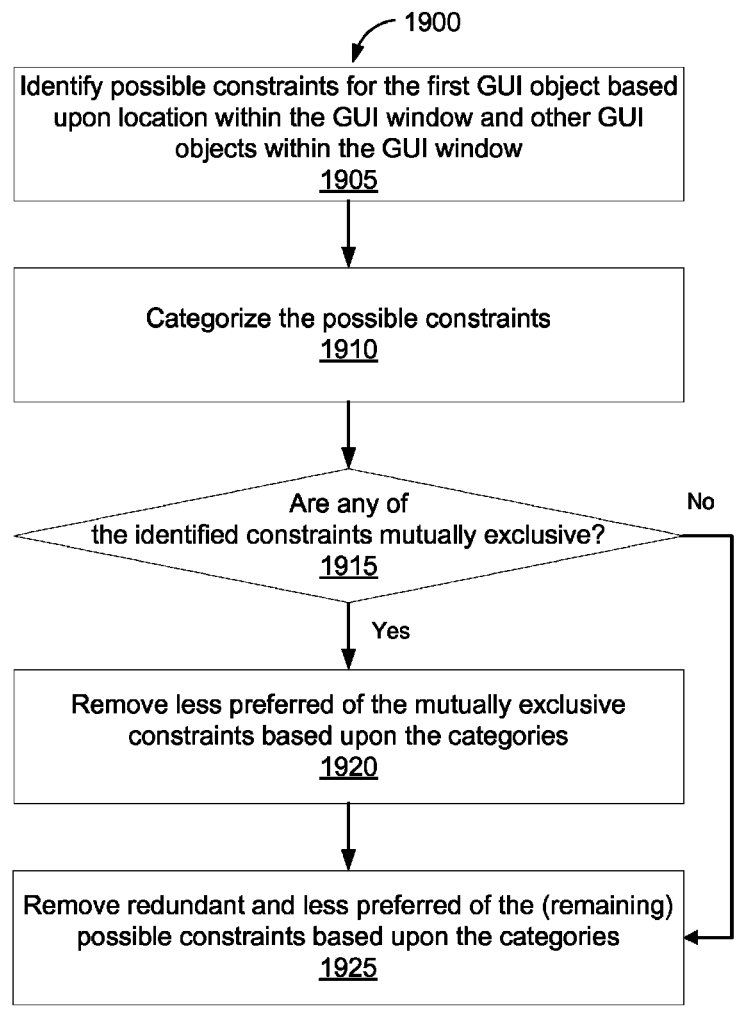
FIG. 19 is a flow chart that illustrates an exemplary method of automatically generating a plurality of constraints.

FIG. 19 is a flow chart that illustrates an exemplary method 1900 of automatically generating a plurality of constraints. In one embodiment, the computer attempts to meet various goals in generating the plurality of constraints, including generating constraints that will produce a layout that matches what the user sees in a visual layout tool, avoiding mutually exclusive constraints, generating just enough constraints to avoid ambiguity of size or position, and keeping the most preferable of the candidate constraints.

At block 1905, computer implementing a layout design tool identifies possible constraints for the first user interface object based upon the location within the GUI window and the location of other user interface objects within the GUI window. For example, the computer may generate location and/or size constraints based upon a distance from each edge of the first user interface object to a corresponding edge of the GUI window and/or to another user interface object. Additionally, the computer may generate constraints, e.g., based upon content within the first user interface object, the size of the first user interface object as it appears when added, moved, or modified within the GUI window, etc.

In one embodiment, a minimum of four constraints is generated to define width of the user interface object, height of the user interface object, horizontal location of the user interface object, and vertical location of the user interface object. In an embodiment in which constraints are expressed as linear equations, two constraints for each position and size enable the computer to solve for the variables (e.g., using a linear arithmetic constraint solving algorithm) and helps avoid ambiguity of position or size.

At block 1920, the computer categorizes the possible constraints into categories. Exemplary categories include: (1) constraints defined explicitly by the user, (2) constraints that meet predefined/recommended visual interface guidelines, (3) constraints that define a typical or desirable size and/or position of the first user interface object relative to resizing of the user interface window or of the second user interface object, and (4) constraints that define the size and position of the first user interface object to best mimic size and position when the first user interface object was added or moved to the first location during layout. In one embodiment, the constraint categories above are listed in order of preference. In an alternate embodiment, preferences between the categories may be in a different order.

For example, referring to the category of constraints that define a typical or desirable size and/or position of the first user interface object relative to resizing of the user interface window or of the second user interface object, a user typically will not expect a button to resize in response to a GUI window being resized but the user would likely expect a table to resize in response to a GUI window being resized. In one embodiment, if a button is added to the GUI window, constraints of this category define the position of the button according to the button's leading and top edges and the size of the button based upon the button's width and height as it appears during layout. As a result, the button will appear in a location relative to the top, leading corner of the GUI window (or container within the GUI window) and maintain the width and height regardless of resizing of the GUI window. In one embodiment, if a table is added to the GUI window, constraints of this category define the position and size of the table according to the table's leading, trailing, top and bottom edges. As a result, all four of the edges of the table will maintain distances from corresponding edges of the GUI window (or container within the GUI window) and the table will resize along with the resizing of the GUI window.

Referring to the category of constraints that define the size and position of the first user interface object to best mimic size and position when the first user interface object was added or moved to the first location during layout, exemplary constraints that would best mimic the layout include positional constraints between the leading and bottom edges of the user interface object and the leading and bottom edges of the GUI window (or container within the GUI window) and size constraints based upon the object's width and height as the object appears during layout.

At block 1915, the computer determines if any of the possible constraints are mutually exclusive. Mutually exclusive constraints include two constraints that cannot both be simultaneously satisfied. For example, a button width=50 and a button width=100 are mutually exclusive because the button cannot have a width of both 50 and 100 simultaneously.

At block 1920, if any of the possible constraints are mutually exclusive, the computer selects between the mutually exclusive constraints. In one embodiment, the computer removes the less preferred of the mutually exclusive constraints based upon preferences between the categories as described above.

At block 1925, if none of the possible constraints are mutually exclusive, or if less preferred mutually exclusive constraints have been removed, the computer removes redundant and less preferred of the remaining possible constraints based upon preferences between the categories as described above.

In addition to the automatically generated constraints described above, a user may explicitly add constraints. A user may explicitly add a constraint through a visual layout tool (e.g., selecting objects and selecting an add constraint menu option) or by writing the constraint in program code.

In one embodiment, the program code is written in a manner that provides a visual representation of the layout the program code describes. For example, a distance of twelve points between two buttons may be programmatically expressed as [button1]-12-[button2]. A single hyphen (without a numerical value) may represent a predefined visual guideline spacing: [button1]-[button2].

Figure 20:
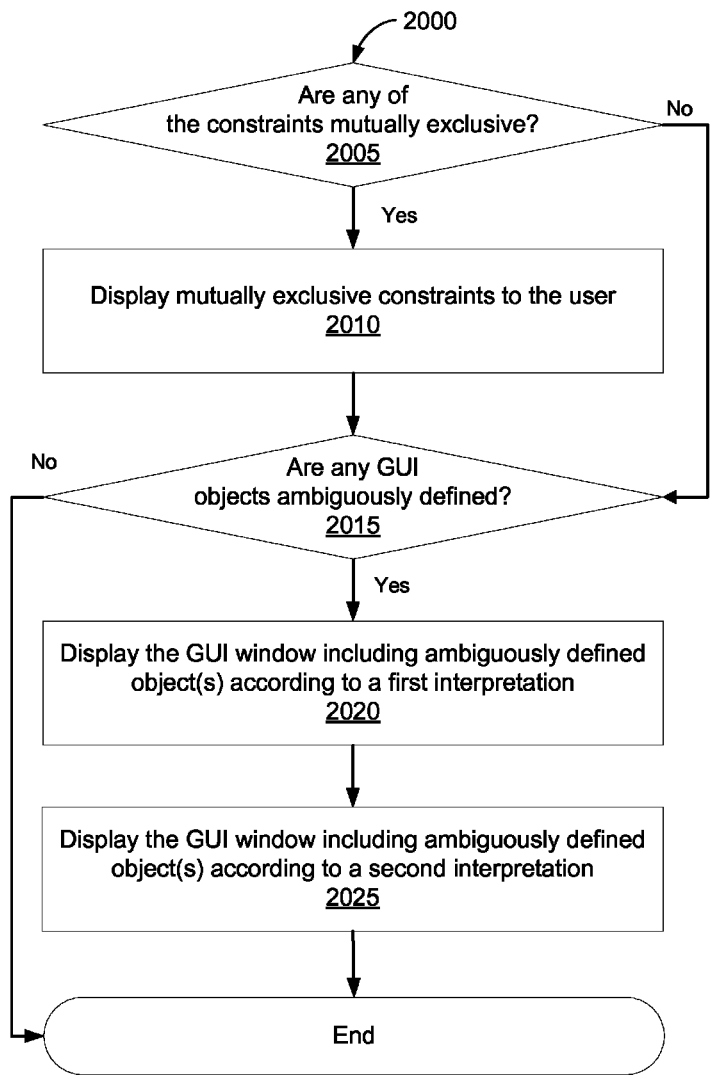
FIG. 20 is a flow chart that illustrates an exemplary method of addressing incompatible or ambiguous constraints.

FIG. 20 is a flow chart that illustrates an exemplary method 2000 of debugging mutually exclusive or ambiguous constraints to assist the user with debugging explicitly added constraints. At block 2005, the computer determines if any incompatible/mutually exclusive constraints. Exemplary mutually exclusive constraints include those that simultaneously define a user interface object with two different widths, side by side user interface objects with defined widths that, together, exceed the width of the user interface object that contains the side by side user interface objects or the width of GUI window, etc.

At block 2010, if mutually exclusive constraints are found, the computer displays the mutually exclusive constraints to the user or otherwise alerts user to the incompatibility. The user may then remove one or more of the incompatible constraints.

At block 2015, if no mutually exclusive constraints or after the user has been alerted to incompatibilities, the computer determines if any user interface objects are ambiguously defined due to a lack of constraints. If no ambiguously defined user interface objects are found, the method 2000 ends.

At block 2020, if an ambiguously defined user interface object is found, the computer displays the GUI window (e.g., by running the underlying program code) including the identified user interface object according to a first interpretation of the one or more constraints defined within the user interface window. At block 2025, in response to user input, the computer displays the user interface window including the identified user interface object according to a second interpretation of the one or more constraints.

The method 2000 may be separated into multiple independent methods. In one embodiment, the method 2000 begins at block 2015. Alternatively, the method 2000 may end at block 2010.

Figures 21A, 21B:
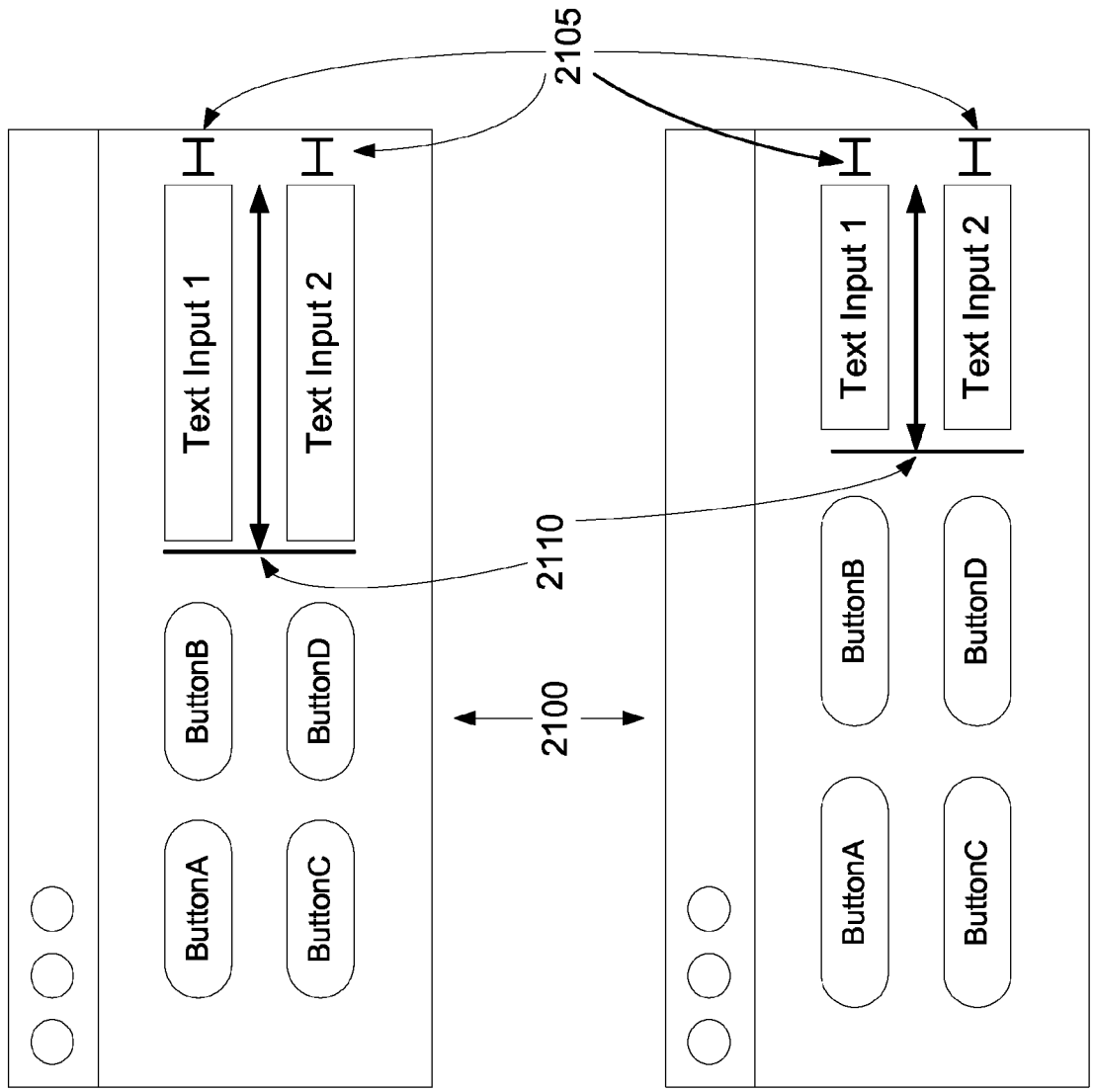
FIGS. 21A and 21B illustrate an GUI window displaying two different interpretations of the one or more constraints included with a GUI window during debugging.

FIGS. 21A and 21B illustrate an exemplary GUI window 2100 displaying two different interpretations of the one or more constraints 2105 and 2110 during debugging. The horizontal positioning constraints 2105 define a position of the text input boxes relative to the right edge of the GUI window 2100. Additionally, the size constraint 2110 defines a minimum width for both of the text input boxes. The buttons, however, lack constraints to define their width. The debugging method 2000 alternates between the layouts shown in FIGS. 21A and 21B to visually demonstrate the ambiguity to the user. In one embodiment, the alternation between layouts is performed in response to input to display the ambiguity.

The user may add additional constraints (e.g., defining the width of the buttons) to remove the now easily identified ambiguity.

Figure 22:
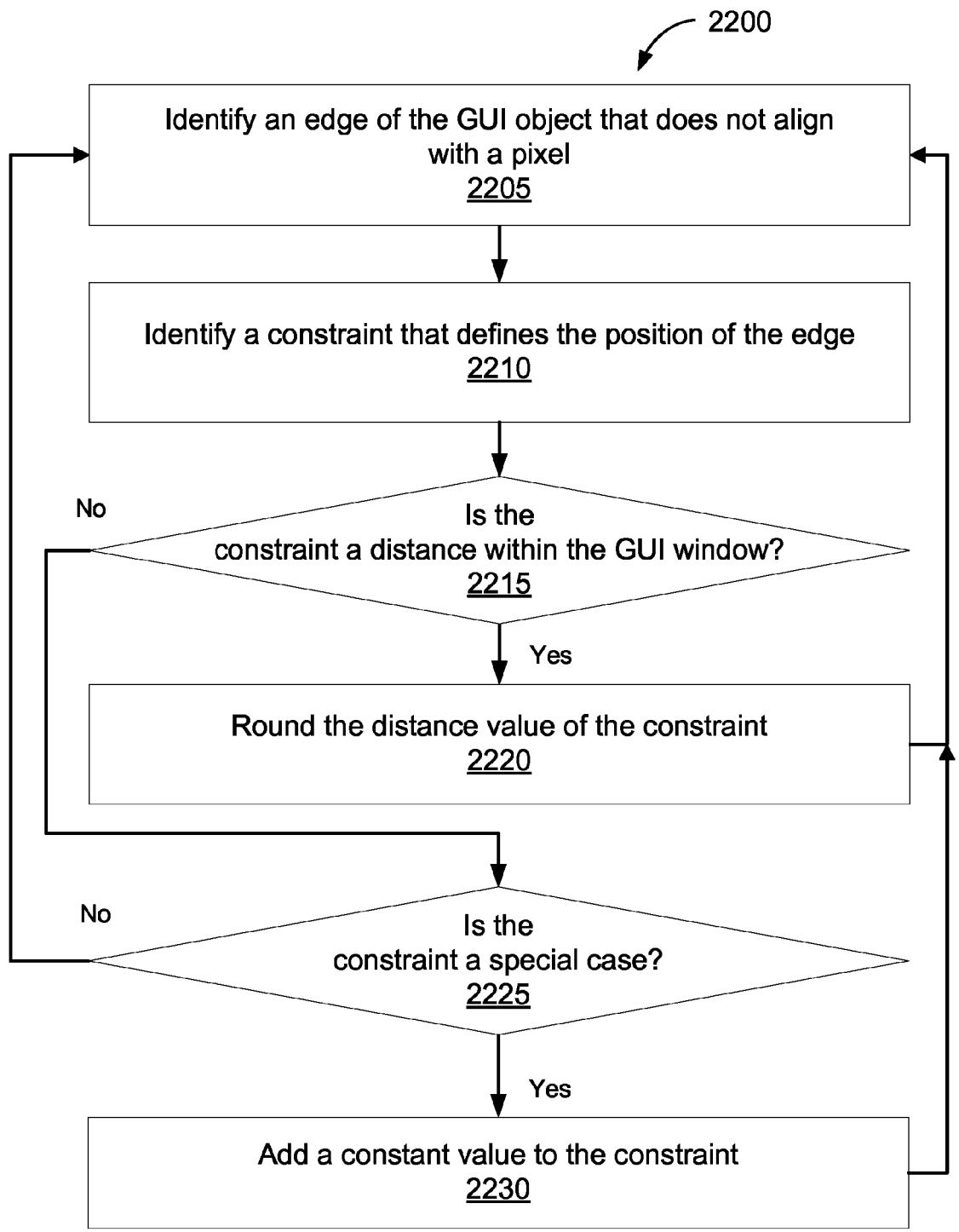
FIG. 22 is a flow chart that illustrates an exemplary method of modifying constraints to align an edge of a user interface object with a pixel.

FIG. 22 is a flow chart that illustrates an exemplary method 2200 of modifying constraints to align an edge of a user interface object with a pixel. Unaligned edges may appear blurred and are therefore undesirable.

At block 2205, the computer identifies an edge of a user interface object that does not align with a pixel. At block 2210, the computer identifies a constraint that defines the position of the unaligned edge. At block 2215, the computer determines if the identified constraint is a distance within the GUI window (e.g. a space between objects, space between an object and the GUI window, a width an object, or a height an object). At block 2220, if the constraint is a distance, the distance value of the constraint is rounded to cause the edge to align with the pixel. At block 2225, if the constraint is not a distance, the computer determines if the constraint qualifies as a special case. For example, special cases may include constraints that center objects or constraints that cause multiple objects to maintain the same height and/or width. At block 2230, if the constraint qualifies as a special case, a constant value is added to the constraint. For example, a constant value of 0.5 may be added in the special case of a centering constraint while a constant value of 1 may be added in the special case of a constraint that causes multiple objects to maintain the same height and/or width.

In one embodiment, the method 2200 is repeated, e.g., after block 2220 or after block 2230, in attempt to resolve all unaligned edges. In the interest of generating the display of the GUI window in a timely manner, the method 2220 will not repeat beyond a threshold. In one embodiment, the threshold may be time. In an alternate embodiment, the threshold may be a number of attempts at modifying constraints. Each modification of a constraint may have an impact on multiple objects, thereby causing the need for additional modifications. The goal of method 2220 is to try to find a solution that aligns as many edges as possible without freezing or overly delaying the display of the GUI window.

In the foregoing specification, the invention has been described with reference to specific exemplary embodiments thereof. It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A computer-implemented method comprising:
    receiving, by the computer, user input to move, resize, or add a first user interface object to a first location in a user interface window, wherein the user interface window includes a second user interface object in a second location;
    generating, by the computer in response to the user input to move, resize, or add the first user interface object, a plurality of constraints based upon the first location and the second location, wherein the constraints define a size or a position of the first user interface object relative to the second user interface object; and
    displaying the first user interface object within the user interface window according to the determined plurality of constraints.

2. The method of claim 1, further comprising:
    moving the first user interface object to a third location based upon the plurality of constraints and in response to receiving user input to move or resize the second object or to resize the user interface window.

3. The method of claim 1, wherein one of the plurality of constraints is defined by an inequality between the size or position of the first user interface object and a size of the user interface window or a size or position the second user interface object.

4. The method of claim 1, further comprising:
    assigning a priority level to each of the plurality of constraints, wherein priority levels define which constraints are implemented when less than all constraints for the user interface window can be implemented.

5. The method of claim 4, further comprising:
    identifying two mutually exclusive constraints; and
    in response to identifying the two mutually exclusive constraints, reducing the priority level of one of the two mutually exclusive constraints.

6. The method of claim 1, wherein one of the plurality of constraints is defined in relation to leading and trailing portions of the first user interface object and wherein the leading and trailing portions are variably defined as left and right or right and left.

7. The method of claim 1, wherein the plurality of constraints includes four constraints to define the position of the first user interface object and the size of the first user interface object.

8. The method of claim 1, wherein generating the plurality of constraints includes identifying possible constraints and selecting between constraints that redundantly define a position or size of the first user interface object.

9. The method of claim 1, wherein generating the plurality of constraints includes identifying possible constraints and selecting between mutually exclusive constraints.

10. The method of claim 1, wherein generating the plurality of constraints comprises:
    identifying possible constraints;
    categorizing the possible constraints into categories including
        user defined constraints,
        constraints that meet predefined visual guidelines,
        constraints that define the size and position of the first user interface object relative to resizing of the user interface window or of the second user interface object, and
        constraints that define the size and position of the first user interface object as the size and position when the first user interface object was added or moved to the first location; and
    selecting the plurality of constraints from the possible constraints based upon priorities between the categories.

11. The method of claim 1, further comprising:
    identifying a user interface object that is ambiguous due to a lack of constraints;
    displaying the user interface window including the identified user interface object according to a first interpretation of one or more constraints defined within the user interface window; and
    displaying, in response to user input, the user interface window including the identified user interface object according to a second interpretation of the one or more constraints.

12. The method of claim 1, further comprising:
    modifying one of the plurality of constraints to have an edge of the first user interface object align with a pixel, wherein the modifying includes rounding a value of the one of the plurality of constraints or adding a constant value to the one of the plurality of constraints.

13. A non-transitory machine-readable medium storing instructions that, when executed, cause a processing device to perform a method comprising:
    receiving, by the processing device, user input to move, resize, or add a first user interface object to a first location in a user interface window, wherein the user interface window includes a second user interface object in a second location;
    generating, by the processing device in response to the user input to move, resize, or add the first user interface object, a plurality of constraints based upon the first location and the second location, wherein the constraints define a size or a position of the first user interface object relative to the second user interface object; and
    displaying the first user interface object within the user interface window according to the determined plurality of constraints.

14. The non-transitory machine-readable medium of claim 13, wherein the instructions, when executed, cause the processing device to perform a method further comprising:
    moving the first user interface object to a third location based upon the plurality of constraints and in response to receiving user input to move or resize the second object or to resize the user interface window.

15. The non-transitory machine-readable medium of claim 13, wherein one of the plurality of constraints is defined by an inequality between the size or position of the first user interface object and a size of the user interface window or a size or position the second user interface object.

16. The non-transitory machine-readable medium of claim 13, wherein the instructions, when executed, cause the processing device to perform a method further comprising:
    assigning a priority level to each of the plurality of constraints, wherein priority levels define which constraints are implemented when less than all constraints for the user interface window can be implemented.

17. The non-transitory machine-readable medium of claim 16, wherein the instructions, when executed, cause the processing device to perform a method further comprising:
    identifying two mutually exclusive constraints; and
    in response to identifying the two mutually exclusive constraints, reducing the priority level of one of the two mutually exclusive constraints.

18. The non-transitory machine-readable medium of claim 13, wherein one of the plurality of constraints is defined in relation to leading and trailing portions of the first user interface object and wherein the leading and trailing portions are variably defined as left and right or right and left.

19. The non-transitory machine-readable medium of claim 13, wherein the plurality of constraints includes four constraints to define the position of the first user interface object and the size of the first user interface object.

20. The non-transitory machine-readable medium of claim 13, wherein generating the plurality of constraints includes identifying possible constraints and selecting between constraints that redundantly define a position or size of the first user interface object.

21. The non-transitory machine-readable medium of claim 13, wherein generating the plurality of constraints includes identifying possible constraints and selecting between mutually exclusive constraints.

22. The non-transitory machine-readable medium of claim 13, wherein generating the plurality of constraints comprises:
    identifying possible constraints;
    categorizing the possible constraints into categories including
        user defined constraints,
        constraints that meet predefined visual guidelines,
        constraints that define the size and position of the first user interface object relative to resizing of the user interface window or of the second user interface object, and
        constraints that define the size and position of the first user interface object as the size and position when the first user interface object was added or moved to the first location; and
    selecting the plurality of constraints from the possible constraints based upon priorities between the categories.

23. The non-transitory machine-readable medium of claim 13, wherein the instructions, when executed, cause the processing device to perform a method further comprising:
    identifying a user interface object that is ambiguous defined due to a lack of constraints;
    displaying the user interface window including the identified user interface object according to a first interpretation of the one or more constraints defined within the user interface window; and
    displaying, in response to user input, the user interface window including the identified user interface object according to a second interpretation of the one or more constraints.

24. The non-transitory machine-readable medium of claim 13, wherein the instructions, when executed, cause the processing device to perform a method further comprising:
    modifying one of the plurality of constraints to have an edge of the first user interface object align with a pixel, wherein the modifying includes rounding a value of the one of the plurality of constraints or adding a constant value to the one of the plurality of constraints.

25. An apparatus comprising:
    a display;
    a processing device coupled to the display, wherein the processing device executes instructions that cause the processing device to
        receive user input to move, resize, or add a first user interface object to a first location in a user interface window on the display, wherein the user interface window includes a second user interface object in a second location;
        generate, by the processing device in response to the user input to move, resize, or add the first user interface object, a plurality of constraints based upon the first location and the second location, wherein the constraints define a size or a position of the first user interface object relative to the second user interface object; and
        display the first user interface object within the user interface window according to the determined plurality of constraints.

26. A non-transitory machine-readable medium storing instructions that, when executed, cause a processing device to display a graphical user interface designed using a method comprising:
    receiving, by the processing device, user input to move, resize, or add a first user interface object to a first location in a user interface window, wherein the user interface window includes a second user interface object in a second location;
    generating, by the processing device in response to the user input to move, resize, or add the first user interface object, a plurality of constraints based upon the first location and the second location, wherein the constraints define a size or a position of the first user interface object relative to the second user interface object; and
    displaying the first user interface object within the user interface window according to the determined plurality of constraints.

* * * * *